(12) United States Patent
Chapman et al.

(10) Patent No.: US 12,430,489 B1
(45) Date of Patent: Sep. 30, 2025

(54) RESTRUCTURING ALGORITHM FOR INCLUDING USER-SPECIFIED CLOCK INSTANCES IN A POST-CTS CLOCK TREE

(71) Applicant: Cadence Design Systems, Inc., San Jose, CA (US)

(72) Inventors: Andrew Mark Chapman, Milton (GB); Ruth Patricia Jackson, Cambridge (GB); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 576 days.

(21) Appl. No.: 17/983,364

(22) Filed: Nov. 8, 2022

(51) Int. Cl.
*G06F 30/396* (2020.01)
*G06F 30/3308* (2020.01)
*G06F 30/373* (2020.01)
*G06F 119/12* (2020.01)

(52) U.S. Cl.
CPC ........ *G06F 30/396* (2020.01); *G06F 30/3308* (2020.01); *G06F 30/373* (2020.01); *G06F 2119/12* (2020.01)

(58) Field of Classification Search
CPC .. G06F 30/396; G06F 30/373; G06F 30/3308; G06F 2119/12
USPC ............ 716/113, 108, 134, 136; 703/16, 19
See application file for complete search history.

(56) References Cited

U.S. PATENT DOCUMENTS

| 5,849,610 | A | * | 12/1998 | Zhu | .................. | H10D 89/10 |
| | | | | | | 438/129 |
| 5,963,728 | A | * | 10/1999 | Hathaway | ............. | G06F 30/394 |
| | | | | | | 716/108 |
| 6,934,872 | B2 | * | 8/2005 | Wong | ................... | G06F 1/10 |
| | | | | | | 703/19 |

(Continued)

FOREIGN PATENT DOCUMENTS

| CN | 105653748 | B | * | 3/2019 | | |
| CN | 116167330 | A | * | 5/2023 | ........... | G06F 30/396 |

(Continued)

OTHER PUBLICATIONS

Han, "IC Physical Design Methodologies for Advanced Process Nodes", University of California, San Diago, 2018, 240 pages. (Year: 2018).*

*Primary Examiner* — Phallaka Kik
(74) *Attorney, Agent, or Firm* — Schwegman Lundberg & Woessner, P.A.

(57) ABSTRACT

A clock tree generated through clock tree synthesis (CTS) for an integrated circuit (IC) design is stored in memory. The IC design includes a post post-CTS clock tree that includes a plurality of clock nets. A request to add a user-specified clock instance to the post-CTS clock tree is received and all logically equivalent clock nets in the post-CTS clock tree detected to generate a set of candidate clock nets. A reduced set of candidate clock nets is generated from the set of candidate clock nets based on a distance between each candidate clock net and the clock instance. One candidate clock net in the reduced set is selected based on a length of (Continued)

conductive traces required to interconnect the corresponding candidate clock net and the clock instance. The post-CTS clock tree is restructured to connect the clock instance to the selected one of the candidate clock nets.

20 Claims, 17 Drawing Sheets

(56) References Cited

U.S. PATENT DOCUMENTS

| | | | |
|---|---|---|---|
| 6,941,533 B2 * | 9/2005 | Andreev | G06F 1/10 716/108 |
| 7,039,891 B2 * | 5/2006 | Tetelbaum | G06F 30/392 716/124 |
| 7,225,421 B2 * | 5/2007 | Migatz | G06F 30/39 716/135 |
| 8,453,085 B2 * | 5/2013 | Ge | G06F 30/3315 716/108 |
| 8,819,607 B1 * | 8/2014 | Pan | G06F 30/34 716/113 |
| 8,966,425 B1 * | 2/2015 | Eisenstadt | G06F 30/394 716/120 |
| 9,892,227 B1 * | 2/2018 | Bisht | G06F 30/33 |
| 10,073,944 B2 * | 9/2018 | Rajaram | G06F 1/10 |
| 10,614,261 B1 * | 4/2020 | Alexander | G06F 30/396 |
| 10,740,532 B1 * | 8/2020 | Reece | G06F 30/396 |
| 10,769,345 B1 * | 9/2020 | Chapman | G06F 30/392 |
| 10,860,761 B1 * | 12/2020 | Vanukuri | G06F 30/396 |
| 10,860,765 B1 * | 12/2020 | Li | G06F 30/337 |
| 10,963,617 B1 * | 3/2021 | Chapman | G06F 30/20 |
| 11,023,646 B2 * | 6/2021 | Subramaniam | G06F 30/30 |
| 11,354,479 B1 * | 6/2022 | Chapman | G06F 30/398 |
| 11,620,428 B1 * | 4/2023 | Chapman | G06F 30/396 716/113 |
| 11,645,441 B1 * | 5/2023 | Jiang | G06F 30/398 716/108 |
| 12,061,857 B1 * | 8/2024 | Chapman | G06F 30/396 |
| 2003/0014724 A1 * | 1/2003 | Kojima | G06F 30/30 716/113 |
| 2008/0059923 A1 * | 3/2008 | Sasaki | G06F 30/33 716/109 |
| 2008/0066043 A1 * | 3/2008 | Lin | G06F 30/327 716/134 |
| 2015/0214951 A1 * | 7/2015 | Peng | G06F 30/392 326/93 |
| 2019/0205489 A1 * | 7/2019 | de Lescure | G06F 12/0815 |
| 2020/0210544 A1 * | 7/2020 | Janac | G06F 30/392 |

FOREIGN PATENT DOCUMENTS

| | | | | |
|---|---|---|---|---|
| JP | 2000057197 A | * | 2/2000 | |
| JP | 3132655 B2 | * | 2/2001 | |
| JP | 4066605 B2 | * | 3/2008 | |
| KR | 20040046284 A | * | 6/2004 | |
| KR | 20220055808 A | * | 5/2022 | H03K 3/027 |

* cited by examiner

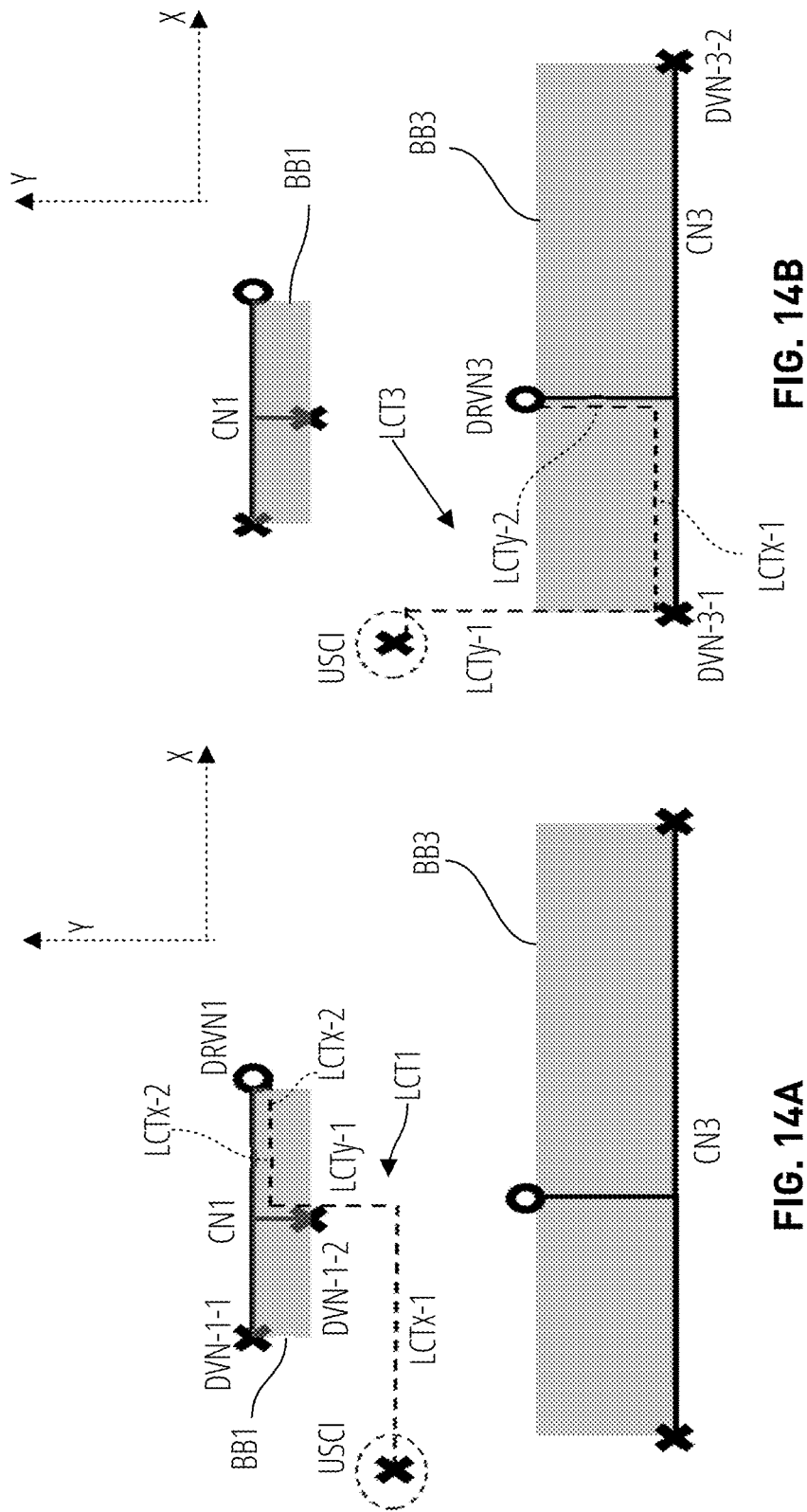

RESTRUCTURING ALGORITHM FOR INCLUDING USER-SPECIFIED CLOCK INSTANCES IN A POST-CTS CLOCK TREE

TECHNICAL FIELD

The present disclosure generally relates to the technical field of integrated circuit design. In particular, the present disclosure is directed to systems and methods for restructuring a clock tree formed through clock tree synthesis (CTS) to include one or more additional user-specified clock instances.

BACKGROUND

An integrated circuit (IC) layout specifies portions of various components of an IC. An IC typically includes a large number of registers, latches, flip-flops and/or other types of clocked devices, which are referred to herein generally as "clock sinks." These clock sinks must be clocked by one or more clock signals in the IC, and the IC must include one or more clock trees for distributing a clock signal from a clock source to all of the clock sinks to be clocked by the clock signal. A clock tree distributes a clock signal from a root node (or root) to a set of clock sinks within an IC through a branching network of clock drivers (e.g., buffers or inverters). A single driver distributes the clock signal to a grouping of other drivers and/or clock sinks. Connectivity between a driver and its fanout to other drivers or sinks is represented by a "clock net" and will be physically implemented by routed conductive traces, which may be referred to as "routes" or "connections" herein.

Clock tree synthesis (CTS) is the process of structuring a clock tree to provide the clock signal from the root to all the clock drivers and clock sinks so that the clock signal ideally arrives at or is received by all clock sinks at the same time. The clock signal is said to be a propagated clock signal as the clock signal is communicated from or "propagates" from the root through clock drivers and conductive traces to the clock sinks. The clock drivers are included in the clock tree, as required, to ensure the propagated clock signal meets required transition time or slew rate specifications for the clock tree. The clock tree must be structured or synthesized so that the propagated clock signal meets the required slew rate specifications as well as required insertion delay and skew for all the clock sinks in the clock tree. There is a need for improved techniques for making modifications to a synthesized clock tree.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Various ones of the appended drawings merely illustrate example embodiments of the present inventive subject matter and cannot be considered as limiting its scope.

FIG. 14A illustrates estimating a conductive trace length between the user-specified post-CTS addition and a driving node of the selected candidate clock net of FIG. 13A in accordance with some embodiments of the present disclosure.

FIG. 14B illustrates estimating a conductive trace length between the user-specified post-CTS addition and a driving node of the selected candidate clock net of FIG. 13B in accordance with some embodiments of the present disclosure.

DETAILED DESCRIPTION

Figure 1:
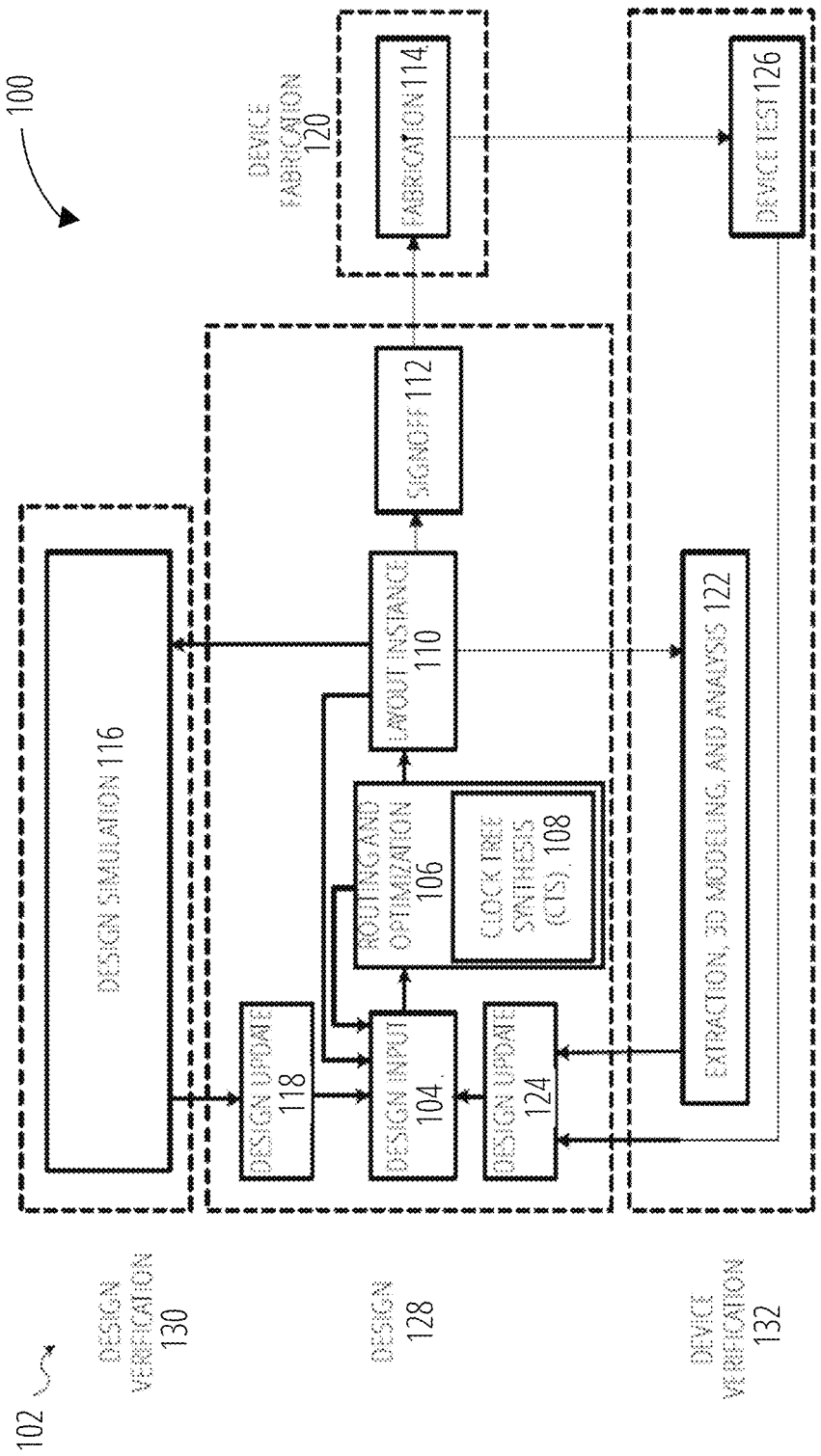
FIG. 1 illustrates an example design process flow that includes post-CTS clock tree modifications to a clock tree in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Electronic design automation (EDA) software systems commonly perform clock-tree synthesis (CTS). Conventional approaches to CTS typically include a labor-intensive process that generates a mapping of clock signals to each clock sink within a design. Generally, buffers and inverters are inserted along a clock path to achieve required transition times (i.e., slew) of the clock signal propagating through the clock tree. The clock tree is also structured to meet required insertion delay and skew for the clock sinks. The meaning of the terms slew, insertion delay, and skew of clock sinks in a clock tree are discussed in more detail below. For ICs, a clock tree structure typically consumes 15-30% of total power consumption, and may consume up to approximately half of the total power consumption of the IC. Improved clock tree structures may reduce power consumption of the clock tree and thereby help reduce the total power consumption of the IC.

Clock tree synthesis (CTS) is the process of structuring a clock tree to provide the clock signal from the root to all the clock sinks so that the clock signal ideally arrives at or is received by all clock sinks at the same time. The clock signal is said to be a propagated clock signal as the clock signal is communicated from or "propagates" from the root through drivers and conductive traces to the clock sinks. Drivers are included in the clock tree, as required, to ensure the propagated clock signal meets required transition time or slew rate specifications for the clock tree. The clock tree must be structured or synthesized so that the propagated clock signal meets the required slew rate specifications as well as required insertion delay and skew for all the clock sinks in the clock tree. After a clock tree has been synthesized, which will be referred to herein as "post-CTS", modifying the post-CTS clock tree is a difficult and time-consuming process. While this is true, the need arises regularly to make post-CTS clock tree modifications to the clock tree as designers of an IC including the clock tree refine their circuit designs and test the operation of the IC.

These modifications to the post-CTS clock tree are typically submitted by designers through engineering change order (ECOs). An ECO specifies changes to be made to the post-CTS clock tree such as adding a new clock instance to the post-CTS clock tree or moving an existing clock instance contained in the clock tree. In the present description, changes made to a post-CTS clock tree are described in terms of adding a clock instance to the clock tree and this language should be understood to include both adding a new clock instance to the clock tree or moving an existing clock instance contained in the clock tree. The term "clock instance" as used in the present description refers to elements contained in a clock tree including clock sinks, clock gates, clock drivers, and clock nodes, as well combinations of these elements. Thus, a clock instance may include, for example, a clock gate, a clock sink, a clock node, a plurality of clock sinks, a plurality of clock nodes, a plurality of clock sinks and a plurality of clock nodes, and combinations of these elements.

In a typical ECO, a designer or user specifies the clock instance (i.e., the electronic components or elements of the clock instance) being added to the post-CTS clock tree and also indicates a physical location of where they want this clock instance to be located within the clock tree. The user also specifies a desired connection of a clock node of the clock instance being added to a clock net contained within the post-CTS clock tree. These inputs provided by a user in relation to a clock instance being added, namely the clock instance itself, a physical location of the clock instance, and a connection of a clock node of the clock instance to a clock net in the post-CTS clock tree, may be referred to a user-specified clock instance in the present description. As mentioned above, a clock net is a portion of the post-CTS clock corresponding to conductive traces interconnecting a clock driver or driving node and the fanout from this driving node to driven nodes, which are, in turn, connected to other drivers or clock sinks in the clock tree. Accordingly, each clock net includes conductive routes that interconnect a driving node to one or more driven nodes, where the driving node supplies a clock signal that propagates over the conductive traces to the one or more driven nodes.

A typical post-CTS clock tree in an integrated circuit may include a very large number (tens or possibly upwards of a hundred of thousand) of clock nets. Accordingly, there are a very large number of clock nets to which the user-specified clock instance may be connected. Existing EDA software systems do not provide functionality for implementing ECOs providing a user-specified clock instance to be integrated into the post-CTS clock tree. As a result, a post-CTS clock tree must currently be modified or restructured to add a clock instance in one of two ways. Either a designer must manually add the desired clock instance to the post-CTS clock tree, or EDA software system must again be utilized to clock tree synthesis to generate a new clock tree including the desired clock instance being added. Both alternatives are time consuming and therefore costly, and the manual approach may result in a suboptimal restructuring of the post-CTS clock tree. The manual approach is difficult since synthesis of a clock tree generates a post-CTS clock tree in a holistic manner, and any restructuring may result in unwanted impacts on operational characteristics of the clock tree. Accordingly, EDA software systems have conventionally not allowed for restructuring or modifications to a post-CTS clock tree.

Embodiments of the present disclosure are directed to EDA software systems that implement techniques for automatically modifying or restructuring a post-CTS clock tree to include a user-specified clock instance. In accordance with some embodiments of the present disclosure, an EDA system accesses an integrated circuit design stored in memory. The integrated circuit design includes a post-CTS clock tree that includes a plurality of clock nets. Each clock net includes conductive routes that interconnect a driving node that supplies a clock signal to one or more driven nodes that receive the clock signal. A user provides a request, which may be done through an API executed by the EDA software system, to add a user-specified clock instance to the post-CTS clock tree. The request includes a definition of the clock instance being added, a physical location of the clock instance, and a connection of a clock node of the clock instance to an existing clock net in the post-CTS clock tree. The EDA software system then executes a post-CTS process to restructure the post-CTS clock tree to include the user-specified clock instance.

This post-CTS process includes detecting all logically equivalent clock nets contained in the post-CTS clock tree from among the plurality of clock nets to generate a set of candidate clock nets. Logical equivalence of a clock net may be based on a variety of different factors, such as clock polarity, clock gating, power domain, module, and preservation of ports parameters in relation to the user-specified clock instance being added to the post-CTS clock tree. A reduced set of candidate clock nets is then generated from the set of candidate clock nets. This reduced set is based on, for each of the candidate clock nets in the set of candidate clock nets, a distance between the corresponding candidate clock net and the user-specified clock instance. One of the candidate clock nets in the reduced set of candidate clock nets is then selected. This selection is based on, for each of the candidate clock nets in the reduced set of candidate clock nets, a length of a conductive trace required to interconnect the corresponding candidate clock net and the user-specified clock instance. Once this clock net is selected, the process modifies the post-CTS clock tree to connect the clock instance to the selected one of the candidate clock nets.

Performing clock tree synthesis on an EDA software system is a time-consuming process, typically taking hours to rerun or have the system once again perform clock tree synthesis to modify the generated clock tree to include desired user-specified clock instances in the clock tree. In embodiments of the present disclosure, however, the EDA software system implements the CTS process flow including the post-CTS process that allows for automatically restructuring the post-CTS clock tree to include user-specified clock instances in the clock post-CTS clock tree. A clock tree may include a very large number of clock nets, as previously mentioned. Consideration of all such clock nets is not manually possible. Embodiments of the present disclosure allow a user to provide a user-specified clock instance to be added to a post-CTS clock tree and then automatically, through implementation of a process flow executed by the EDA software system, modify or restructure the post-CTS clock tree to include this user-specified clock instance. The clock net that is considered the best or optimal clock net for connecting to the user-specified clock instance may vary in different embodiments of the present disclosure, and will depend on details of the specific restructuring algorithm or process being implemented on the EDA software system.

Reference will now be made in detail to specific example embodiments for carrying out the disclosed subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 is a diagram illustrating an example of an EDA software system 100 that implements a design process flow 102 including a restructuring algorithm for adding user-specified clock instances to a post-CTS clock tree in accordance with some embodiments of the present disclosure. The terms "restructuring," "reformulating," and "modifying" are used interchangeably herein, and each should be understood to mean a change is being made to an existing clock tree, as described in more detail herein with reference to FIGS. 1-16. As shown in FIG. 1, the design process flow 102 includes a design phase 128, a device fabrication phase 120, a design verification phase 130, and a device verification phase 132. The design phase 128 involves an initial design input operation 104 where basic elements and functionality of a device, typically an IC, are determined. The initial design input operation 104 may also include revisions to elements or functionality of the device based on various analyses and optimization of a circuit design to be included in the device. This initial design input operation 104 operation is where block instances are used in the circuit design and any additional circuitry for the design around the blocks is selected. The initial strategy, tactics, and context for the device to be created are also generated in the initial design input operation 104, depending on the particular design algorithm being used.

In some embodiments, following an initial selection of design values in the design input operation 104, routing, timing analysis, and optimization are performed in a routing and optimization operation 106, along with any other automated design processes. While the design process flow 102 shows the routing and optimization operation 106 occurring prior to a layout instance operation 110, routing, timing analysis, and optimization in operation 106 may be performed at any time to verify operation of a circuit design. For instance, in various embodiments, timing analysis in a circuit design may be performed prior to routing of connections in the circuit design, after routing, during register transfer level (RTL) operations, or as part of a signoff operation 112, as will be understood by those skilled in the art.

In FIG. 1, the routing and optimization operation 106 includes a clock tree synthesis (CTS) operation 108, which may be performed in accordance with various embodiments described herein. The CTS operation 108 generates a clock tree that delivers a clock signal from a clock tree root node, which is a clock source of a circuit design, to a plurality of clock tree leaf nodes, which correspond to a plurality of clock instances such as clock sinks within the circuit design. Before describing the CTS operation 108 in more detail, the general structures of clock trees and several key parameters of clock trees, namely transition rate or slew, insertion delay ID, and skew SK, will be described in more detail with reference to FIGS. 2 and 3.

Figure 2:
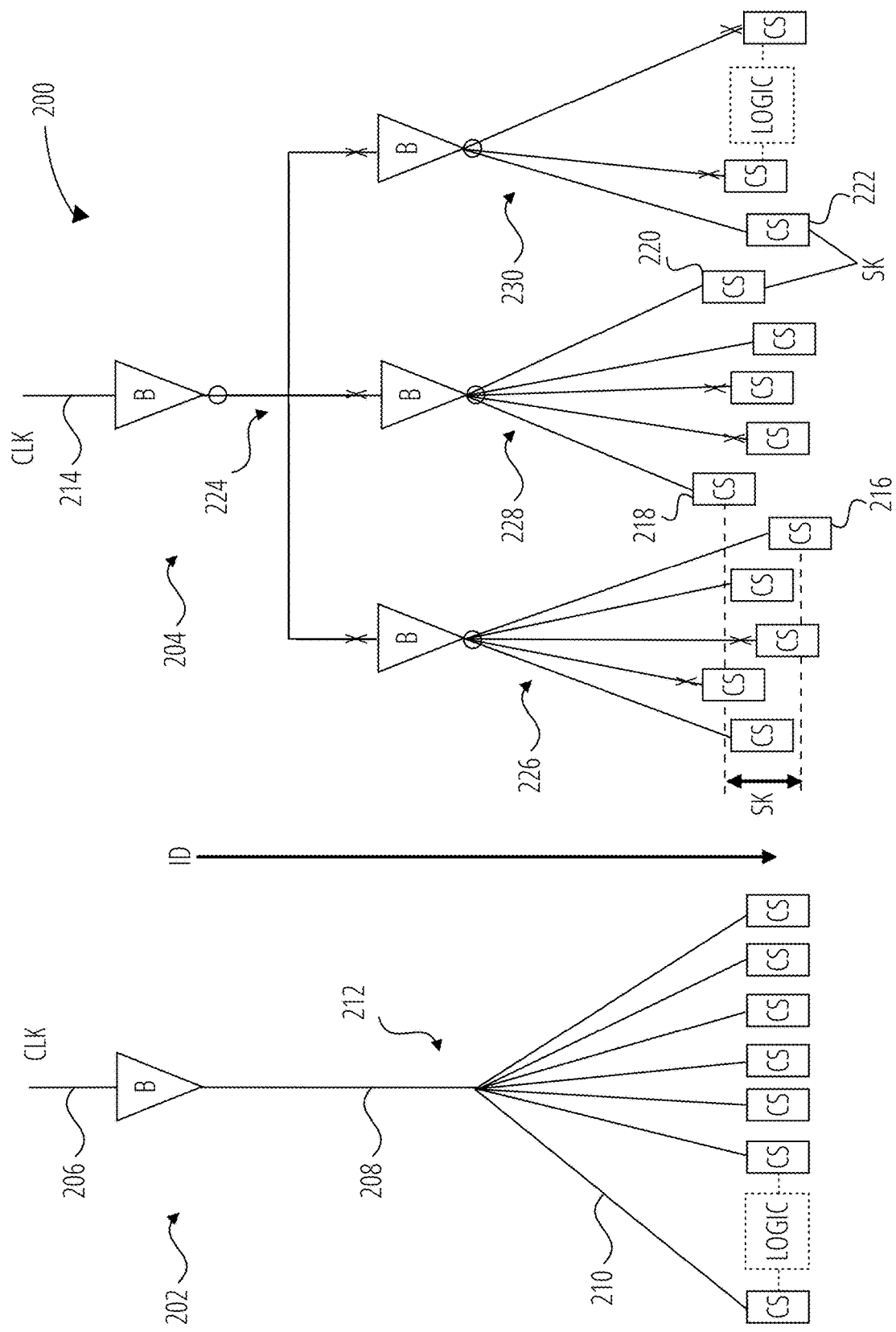
FIG. 2 illustrates logical diagrams of example of unbuffered and buffered clock trees to which post-CTS clock tree modifications may be applied in accordance with some embodiments of the present disclosure.

FIG. 2 illustrates simplified examples of clock trees 200 along with the insertion delay and skew of clock sinks CS in these clock trees. More specifically, FIG. 2 illustrates simplified versions of an unbuffered clock tree 202 and a buffered clock tree 204. In the unbuffered clock tree 202, a buffer B receives a clock signal CLK on a root node 206 of the clock tree and provides a corresponding clock signal on an output and which is distributed over a plurality of conductive traces or routes 208, 210 (hereafter, conductive routes 208, 210) to provide a clock signal to a plurality of clock sinks CS. The conductive routes 208, 210 correspond to a clock net 212 of the clock tree 202. In an EDA software system, the unbuffered clock tree 202 is initially utilized before clock tree synthesis CTS is performed by the system. The unbuffered clock tree 202 is assumed to be "ideal," meaning there is zero insertion delay ID or skew SK and the clock signal is assumed to traverse the clock tree instantaneously.

The buffered clock tree 204 is similar to the unbuffered clock tree 202 except that the buffered clock tree includes additional buffers B for distributing the clock signal CLK to groups of clock sinks CS. The buffered clock tree 204 is generated through clock tree synthesis CTS performed by the EDA system for the IC being designed. The insertion delay ID (i.e., clock latency) of each of the clock sinks CS in the unbuffered clock tree 204 is the delay or time required for the clock signal CLK to propagate from the root node to the clock sinks CS. The CLK signal propagating in this way in the buffered clock tree 204 may be referred to as a propagated clock signal in the present description. The insertion delay ID is illustrated through a downward pointing arrow in FIG. 2, with the value of the insertion delay of clock sinks CS increasing in the downward direction moving further away from the root node 206 of the clock tree. There may be a very large number of clock sinks CS in the clock tree of an IC and thus these clock sinks are commonly divided into groups, each of these groups driven by appropriately sized buffers B in the buffered clock tree 204. Each of the clock trees 202, 204 of FIG. 2 also illustrates logic circuitry coupled between adjacent pairs of clock sinks CS in the respective clock tree. These blocks of logic circuitry, which are shown in dashed lines, are included merely to illustrate that the IC including the clock sinks CS of the clock tree also includes logic circuitry to provide the desired functionality of the IC. During operation of the IC, the clock sinks CS are clocked to, for example, clock data into and out of blocks of logic circuitry. Only a single clock sink CS is shown on either side of the blocks of logic circuitry to simplify the figure, but one skilled in the art will realize that large numbers of clock sinks CS would actually be utilized in clocking data into and out of blocks of logic circuitry.

The buffered clock tree 204 also illustrates the concept of skew among the plurality of clock sinks CS in the clock tree. Skew is the difference in insertion delay ID among the clock sinks CS, and thus indicates differences in time at which respective clock sinks CS receive the propagated clock signal. The unbuffered clock tree 202 shows all clock sinks CS at the same distance from the root node and is assumed to be ideal, meaning zero insertion delay ID and zero skew. In contrast, the clock sinks CS in the buffered clock tree 204 are shown to have varying insertion delays ID, as represented through the different vertical positions of the clock sinks CS relative to a root node 214. The clock sinks CS in the buffered clock tree 204 accordingly have non-zero skew, which will be the case in physically implemented clock trees. A global skew is represented by skew SK shown in the lower left of buffered clock tree 204, where global skew is the difference between a clock sink 216 having the longest insertion delay ID and a clock sink 218 having the shortest insertion delay. A relative skew SK between adjacent clock sinks CS, such as clock sinks 220 and 222, is also illustrated.

The simplified buffered clock tree 204 includes several clock nets 224, 226, 228, 230. A real buffered clock tree in an IC would typically include a very large number of clock nets. Each clock net 224-230 includes conductive routes that interconnect a driving node O to one or more driven nodes X. In the clock net 224, for example, the output of the uppermost buffer B is the driving node, which is represented with an "O," and each of the inputs to the three lower buffers B is a driven node and is represented with an "X." Similarly, in each of the clock nets 226, 228, 230 the output of the corresponding buffer B is the driving node O and a clock input to each of the corresponding clock sinks CS is a driven node X. The clock inputs of only selected ones of the clock sinks CS in each of the clock net 226, 228, 230 are designated as being a driven node X in FIG. 2 merely to simplify the figure, with each every such clock input to a clock sink CS being a driven node even though not being designated with an X in FIG. 2. Methods and systems according to embodiments of the present disclosure allow for adding a user-specified clock instance to the post-CTS buffered clock tree 204 such that the user-specified clock instance being added does not violate design rules or constraints for the buffered clock tree, as will be described in more detail below.

Figure 3:
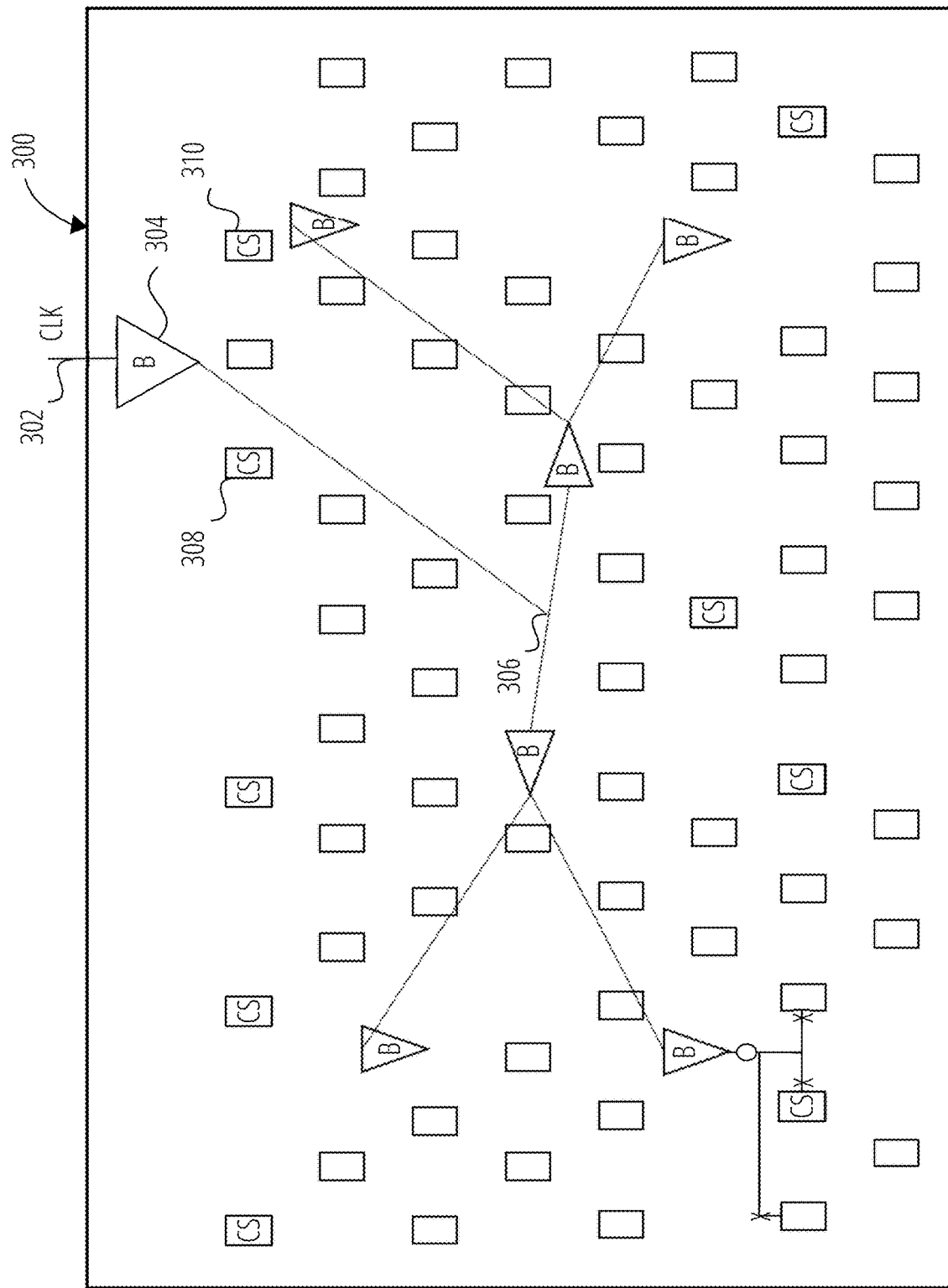
FIG. 3 is a plan view illustrating an example of a clock tree to which post-CTS clock tree modifications may be applied in accordance with some embodiments of the present disclosure.

FIG. 3 is a floorplan or plan view 300 of a simplified buffered post-CTS clock tree of an IC to which a user-specified clock instance may be added in accordance with some embodiments of the present disclosure. The plan view 300 illustrates that an input clock signal CLK applied on a root node 302 of the clock tree is first routed from the root node through a buffer 304 and toward a center 306 of the IC. The CLK signal is thereafter distributed outward from the center 306 to propagate the clock signal to clock sinks CS in the clock tree. This technique helps to better equalize the insertion delays ID of the clock sinks CS. If the CLK signal was to be routed directly from the root node 302 to clock sinks 308, 310, for example, the insertion delays ID of these two clock sinks could be much lower than the insertion delays of the remaining clock sinks CS in the clock tree. Large differences in insertion delays ID among clock sinks CS results in large skews SK among clock sinks in the clock tree, which is undesirable. Thus, as depicted in FIG. 3, the CLK signal is routed from the root node 302 and through the buffer 304 towards the center 306 of the IC, and from the center the clock signal is then routed to additional buffers B arranged in respective regions of the IC. Each of these additional buffers B will provide a propagated clock signal to clock sinks CS proximate the buffer B in the corresponding region of the IC.

Returning now to FIG. 1, according to various embodiments the clock tree reformulation, restructuring or modification is performed as a part of the CTS operation 108. The CTS operation 108 includes placing clock sinks or clock drivers in various regions of the IC design based on satisfaction of a set of clock tree design rules or constraints, which can include slew, insertion delay (i.e., latency), skew, and power consumption of the generated clock tree. Each clock driver delivers the clock signal to a set of clock sinks and/or a further clock driver or set of clock drivers. A clock net of the IC design describes conductive traces or routes between a clock driver and clock sinks as well as any further clock drivers to be driven by the clock driver, as described above with reference to FIG. 2. Any one of the clock sources, clock sinks, and clock drivers, or groups of such components, may be referred to generally herein as a "clock instance." Moreover, clock drivers will typically be referred to as buffers in the present description by way of example of one common type of clock driver.

In operation, the CTS operation 108 constructs an initial clock tree through a suitable technique, such as, for example, using the Steiner-tree approach. With the Steiner-tree approach, a minimum rectilinear Steiner tree (MRST) is used for routing a multi-pin clock net with minimum length for conductive traces or routes connecting to the clock sinks CS. Given m points in the plane, an MRST connects all points by rectilinear lines, possibly via some extra points (called Steiner points), to achieve a minimum-length tree of rectilinear edges. One skilled in the art will understand the utilization of the Steiner-tree approach to formulate an initial clock tree, and the Steiner-tree approach will not be described in detail in the present description. In addition, one skilled in the art will appreciate that the Steiner-tree approach is merely one example of an approach that may be used to construct an initial clock tree. In other embodiments, the CTS operation 108 may utilize one of several other known clock tree construction techniques to construct the conductive routes connecting to the clock sinks CS and other clock instances in the initial clock tree.

As will be discussed further detail below with reference to FIG. 4, the CTS operation 108 performs additional operations as part of the CTS to further refine the structure of the initial clock tree until a complete clock tree has been generated, with this complete clock tree being termed a post-CTS clock tree as mentioned above. Traditionally, the complete clock tree structure corresponds to the finalized clock tree structure and no further changes to the post-CTS clock tree to include user-specified clock instances were possible after generation through CTS. The options to modify the post-CTS clock tree to include user-specified clock instances have conventionally been through manual modifications to the post-CTS clock tree, or by providing design changes relating to the clock instance to be added through the design input operation 104 (FIG. 1) and thereafter once again executing the time-consuming process of CTS. In embodiments of the present disclosure, the CTS operation 108 includes an algorithm that restructures the post-CTS clock tree to include or add user-specified clock instances to the post-CTS clock tree. Details of the CTS operation 108 in adding user-specified clock instances to the post-CTS clock tree are described in more detail below with reference to FIGS. 4-15.

In FIG. 1, after design inputs are used in the design input operation 104 to generate a circuit layout for the functional circuitry of the device being designed, and the routing and optimization operation 106 is performed, a layout is generated in the layout instance operation 110. The layout describes the physical layout dimensions of the device that match the design inputs. Prior to this layout being provided to a fabrication operation 114, the signoff operation 112 is performed on the circuit design defined by the layout.

After signoff verification by the signoff operation 112, a verified version of the layout is used in the fabrication operation 114 to generate a device, or additional testing and design updates may be performed using designer inputs or automated updates based on design simulation operations 116, or extraction, 3D modeling, and analysis operations 122. Once the device is generated, the device can be tested as part of device test operation 126, and layout modifications generated based on actual device performance.

A design update operation 118 from the design simulation operation 116, a design update operation 124 from the device test operation 126 or the extraction, 3D modeling, and analysis operations 122, or the design input operation 104 itself, may occur after the initial layout instance operation 110 is performed. In various embodiments, whenever design inputs are used to update or change an aspect of a circuit design, a timing analysis and the routing and optimization operation 106 may be performed.

Figure 4:
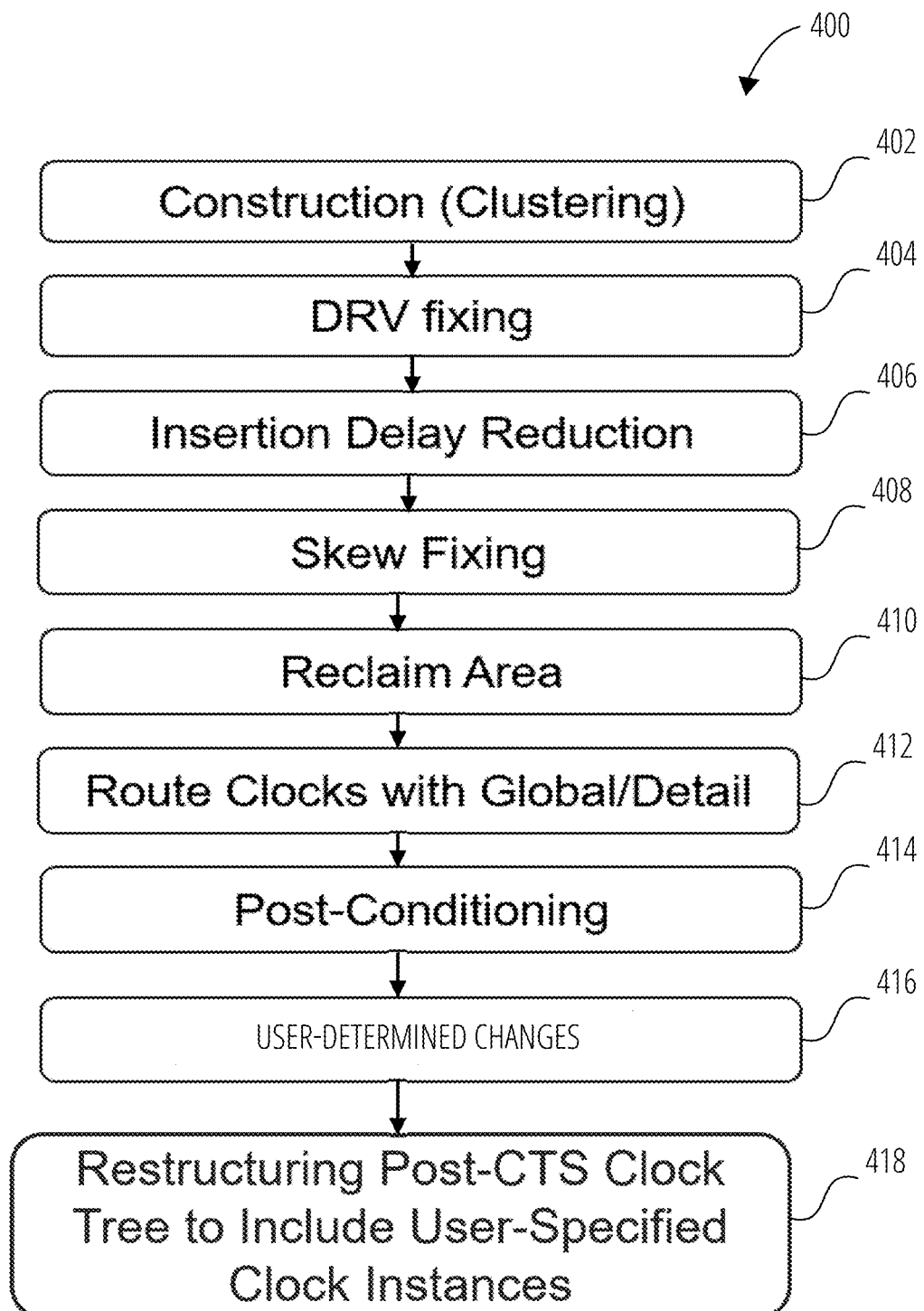
FIG. 4 is a flow diagram illustrating in more detail CTS and applying post-CTS clock tree modifications to a synthesized clock tree in accordance with some embodiments of the present disclosure.

FIG. 4 is a flow diagram illustrating in more detail a CTS process flow 400 which includes operations 402-414 for performing CTS to generate a complete clock tree, and further includes a restructuring the post-CTS clock tree to include user-specified clock instances operation 418 that implements post-CTS modifications to the complete clock tree to include or add one or more user-specified clock instances. The CTS process flow 400 corresponds to one embodiment of the CTS operation 108 of FIG. 1. The operations 402-414 perform traditional operations in CTS and thus each of these operations will not be described in detail herein, with those skilled in the understanding the suitable techniques for performing each of these operations. The CTS process flow 400 starts the CTS in a construction (clustering) operation 402 in which clock sinks CS to be included in the clock tree are grouped or clustered based on some criteria, such as geometry-based K-means clustering or capacitance-based clustering. In the CTS process flow 400, the clustering operation 402 includes the formation of an initial clock tree through Steiner-routing or other suitable technique as described above with reference to the CTS operation 108 of FIG. 1.

The CTS process flow 400 further includes a design rule violation (DRV) fixing operation 404 to fix violations of design rules for the clock tree that are present in the initial clock tree. Design rules are geometric constraints applied to a physical layout of an IC being designed to ensure the designed circuit functions properly, as will be appreciated by those skilled in the art. Typical design rules relate to width of conductive traces or routes, spacing between adjacent conductive routes, along with many other design rules which must be followed to ensure proper functionality of the designed circuit. An insertion delay reduction operation 406 reduces insertion delays ID of clock sinks the clock tree, such as by repositioning clock sinks closer to the root node to reduce insertion delay or adding drivers to increase insertion delay. A skew fixing operation 408 fixes skew violations of propagated signals in the clock tree being synthesized and an area reclamation operation 410 reduces the area occupied by the clock tree in the total layout area of the IC being designed.

A global and detailed routing operation 412 reroutes the initial conductive trace routing generated in the Steiner-tree routing performed by operation 402 with actual physically routing of conductive traces that may be used to connect to the clock sinks CS. For example, in the global routing portion of operation 412 the conductive routes generated through the Steiner-tree routing are physically positioned so that the conductive routes do not short circuit with one another. The detailed routing portion of operation 412 fine tunes the clock tree being synthesized, eliminating any design rule violations arising from the global routing and ensuring that the clock tree is physically synthesizable for the IC being designed. The fine tuning of the clock tree in the detailed routing portion of operation 412 may result in violations of required operating parameters of the clock tree. For example, repositioning of selected conductive routes during detailed routing may change the capacitance of some of these conductive routes and this change in capacitance may result in transition time or slew violations for the propagated clock signal on these conductive routes. A post-conditioning operation 414 fixes slew violations that arise as a result of the detailed routing portion of the operation 412.

After the post-conditioning operation 414, the CTS process flow 400 includes a user-determined changes operation 416 in which a user or designer is able to supply design inputs that the designer forgot to include or realizes needs to be included for the IC being designed. For example, processing in the routing and optimization operation 106 of FIG. 1 may cause the designers to realize that they need to revisit the CTS. Another scenario that may arise in designing an IC is after CTS has been performed (see FIG. 1, operation 108) when a designer is evaluating performance characteristics of the synthesized clock tree, the designer realizes that although the clock tree was implemented correctly in the CTS and satisfied original design specifications for the clock tree, the clock tree is not sufficient for the IC being designed. As a result, the designer must in some way update the specifications or requirements for the clock tree. In conventional EDA systems, the only options in this situation were to re-run CTS or perform manual changes to the synthesized clock tree. Embodiments of the present disclosure allow the designer to restructure the post-CTS clock tree through post-CTS modifications performed on the synthesized clock tree generated after determining such modification are necessary in the user-determined changes operation 416.

The CTS process flow 400 concludes with the restructuring the post-CTS clock tree to include user-specified clock instances operation 418 in which post-CTS modifications are performed on the synthesized clock tree generated after the user-determined changes operation 416 according to embodiments of the present disclosure. As mentioned above, traditionally no changes to the synthesized clock tree to include user-specified clock instances in an ECO have been possible through conventional EDA software systems. The options were to integrate these changes to the post-CTS clock tree manually or by once again running or executing clock tree synthesis on the EDS software system. Performing clock tree synthesis on the EDA software system 100 is a time-consuming process, typically taking hours to rerun or have the system again perform clock tree synthesis to modify the generated clock tree to include desired user-specified instances to the clock tree. In embodiments of the present disclosure, however, the CTS process flow 400 includes the restructuring the post-CTS clock tree to include user-specified clock instances operation 418 that allows a designer to utilize the EDA software system 100 to add user-specified clock instances to the post-CTS clock tree.

In some embodiments, the operation 418 implements an application programming interface (API) that the allows a designer to add a user-specified clock instance to the post-CTS clock tree.

Figure 5:
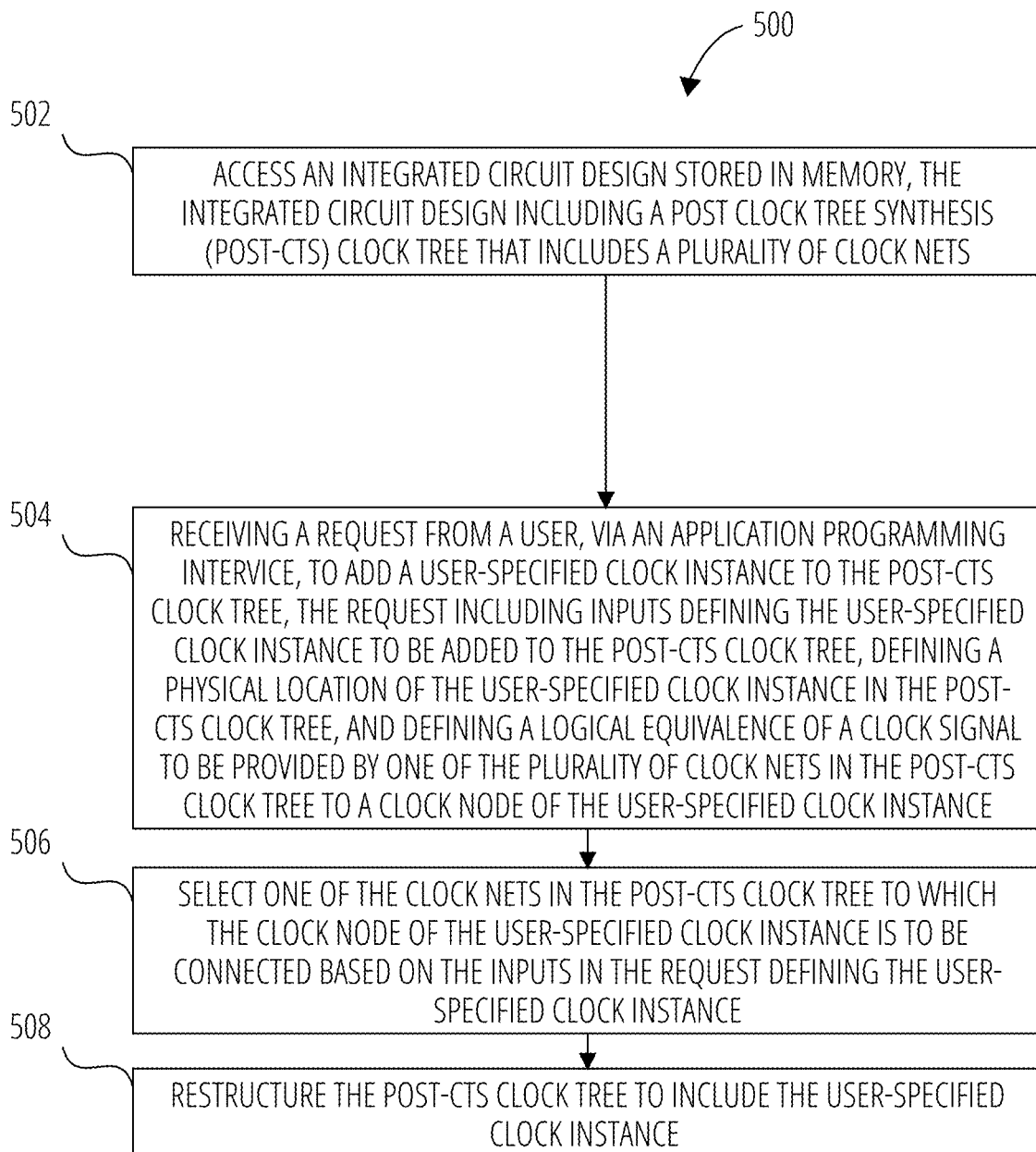
FIG. 5 illustrates a process utilizing an application programming interface (API) to restructure a post-CTS clock tree to include a user-specified clock instance in response to a user request in accordance with some embodiments of the present disclosure.

FIG. 5 illustrates an embodiment of a process 500 that includes an application programming interface (API) that allows a user to restructure, in response to a user request, a post-CTS clock tree to include a user-specified clock instance in accordance with some embodiments of the present disclosure. The API is a new set of commands made available to a designer to allow the designer to specify components of the post-CTS clock tree that are to be updated. More specifically, the set of commands of the API allows the designer to specify components by identifying the components and providing inputs relating to changes relating to these components that are to be made to the post-CTS clock tree. In the present description, these inputs provided by the user via the commands of the API may be referred to as a "user request" or simply a "request." Thus, through a request received from the user or designer via the API, modifications to the post-CTS clock tree may be made without again performing CTS using the EDA software system 100 (FIG. 1). Prior to an API according to embodiments of the present disclosure, there was no way for a user to communicate to the EDA software system 100 the modifications or adjustments to the post-CTS clock tree required by the designer.

The process 500 corresponds to the operation 418 of FIG. 4 in some embodiments of the present disclosure. The process 500 may be performed by a device, such as a computing device executing instructions of an EDA software system. For instance, the operations the process 500 may be represented by executable instructions (e.g., EDA software) that, when executed by a processor of a computing device, cause the computing device to perform the method. Thus, an operation of the process 500 may be performed by a hardware processor (e.g., central processing unit or graphics processing unit) of a computing device (e.g., desktop, server, etc.). Accordingly, the process 500 is described below with reference to such a computing device. Depending on the embodiment, an operation of the process 500 may be repeated in different ways or involve intervening operations not shown. Though the operations of the process 500 may be depicted and described in a certain order, the order in which the operations are performed may vary among embodiments, including performing certain operations in parallel.

The method or process 500 begins in operation 502 in which the process accesses an integrated circuit design stored in memory, the integrated circuit design including a post-CTS clock tree that includes a plurality of clock nets. The process 500 includes an operation 504 of receiving, through an application programming interface (API), a request from a designer or user to restructure the post-CTS clock tree to include a user-specified clock instance.

Figure 6B:
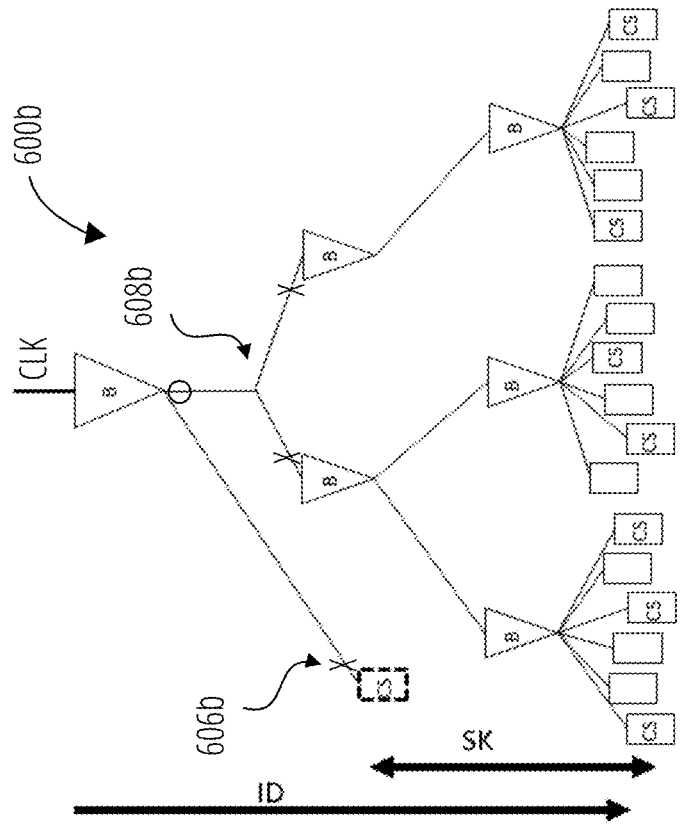
FIG. 6B is a logical diagram of the simplified post-CTS clock tree of FIG. 6A illustrating an example of issues with skew that can arise when adding the user-specified clock instance to the post-CTS clock tree in accordance with some embodiments of the present disclosure.
Figure 6A:
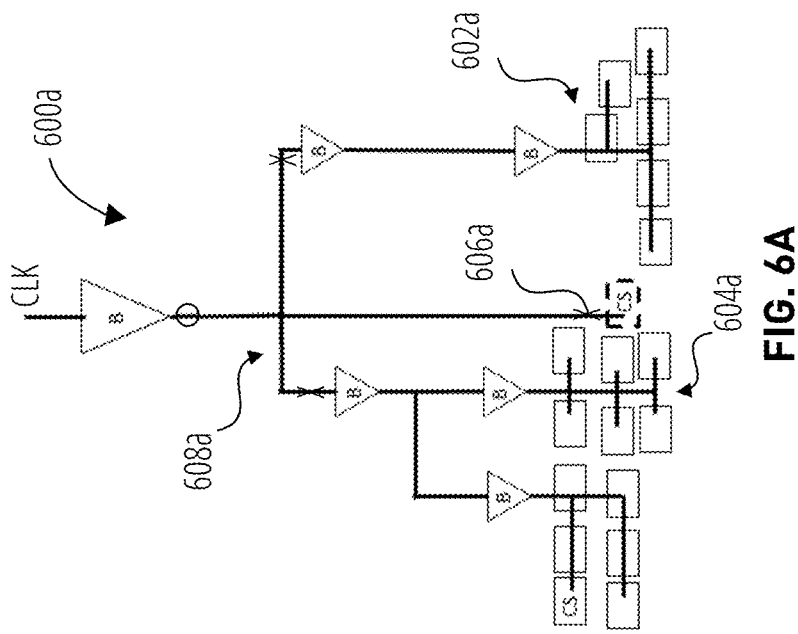
FIG. 6A is an example plan view of a physical layout of a simplified post-CTS clock tree including addition of a user-specified clock instance to the post-CTS clock tree in accordance with some embodiments of the present disclosure.

An example of adding a user-specified clock instance to a simplified post-CTS clock tree is illustrated in FIGS. 6A and 6B. In the example of FIGS. 6A and 6B, the user specified clock instance being added is a clock sink CS, such as a flip-flop, which is represented with dashed lines in these figures. FIG. 6A is a plan view of a physical layout of the simplified post-CTS clock tree 600a including addition of the user-specified clock sink CS and FIG. 6B is a logical diagram of this same simplified post-CTS clock tree 600b illustrating the addition of the user-specified clock sink.

With returned reference to FIG. 5, in operation 504, a request is received from a user through the API including a request from the user to add the user-specified clock instance to the post-CTS clock tree. The request includes inputs defining the user-specified clock instance to be added to the post-CTS clock tree, defining a physical location of the user-specified clock instance in the post-CTS clock tree, and defining a logical equivalence of a clock signal to be provided by one of the plurality of clock nets in the post-CTS clock tree to a clock node of the user-specified clock instance. Referring to FIG. 6A, the user-specified clock instance being added is defined as a clock sink CS and is illustrated in the form of the clock sink CS shown in dashed lines. The physical location of this clock sink CS within the post-CTS clock tree 600a is also defined through the request, with the clock sink CS being positioned between a clock net 602a and a clock net 604a contained in the post-CTS clock tree 600a.

The request also defines the logical equivalence of a clock signal to be provided by one of the plurality of clock nets in the post-CTS clock tree 600a to a clock node 606a of the clock sink CS being added. In the example of FIG. 6A, the logical equivalence is defined through the connection of the clock node 606a of the clock sink CS being added to a clock net 608a in the post-CTS clock tree 600a. Although in the example of FIG. 6A the logical equivalence of the clock sink CS being added is defined through the connection to the clock net 608a, in some embodiments additional parameters of the post-CTS clock tree are utilized in defining logical equivalence of clock nets, as will be discussed in more detail below with reference to FIGS. 9 and 10. A driven node O and several driving nodes X are shown for the clock net 608a. Clock nets and the driving node O and driven nodes X of a clock net will be discussed in more detail below with reference to FIGS. 9-16. The clock sink CS being added includes the clock node 606a, which is a driven node X that is to be connected to clock net 608a. In this way, through the request, the clock node 606a of the clock sink CS being added is initially connected to the driving node O (i.e., the output of the uppermost buffer B) of the clock net 608a. In the present description, the driven node X of the user-specified clock instance being added to the post-CTS clock tree may also be referred to as the "clock node" of the user-specified clock instance, such in the example of FIGS. 6A and 6B for the clock node 606a for the clock sink CS being added.

With returned reference to FIG. 5, the process 500 further includes operation 506 of selecting one of the clock nets in the post-CTS clock tree 600a to which the clock node 606a of the user-specified clock instance is to be connected. This selection is based on the inputs in the request defining the user-specified clock instance. More specifically, embodiments of the present disclosure execute an algorithm that utilizes the inputs provided in the request in determining the optimal clock net in the post-CTS clock tree for connection of the clock node of the user-specified clock instance being added, as will be described in more detail below. The process 500 includes an operation 508 of restructuring the post-CTS clock tree 600a to include the clock sink CS being added. Thus, in operation 508 the clock node 606a of the clock sink CS being added is connected to the selected clock net in the post-CTS clock tree 600a as determined in operation 506. This connection is through new conductive traces added to the post-CTS clock tree 600a. In addition to the new conductive traces added to connect the clock sink CS being added, the operation 508 may also include further changes to the post-CTS clock tree 600a to accommodate the newly added clock sink CS, such as resizing or moving existing clock instances as well as restructuring existing clock nets in the post-CTS clock tree.

The embodiment of FIG. 5 provides an automated way for a designer to modify a post-CTS clock tree to add user-specified clock instances without the need to manually modify the clock tree or once again run CTS to synthesize a completely new clock tree. This greatly reduces the time required to restructure the post-CTS clock tree to include the user-specified clock instance. In addition, an improved restructured post-CTS clock tree is provided compared to a post-CTS clock tree that has been manually restructured. This is true because utilization of the API and the algorithm executed by the API allow all clock nets contained in the post-CTS clock tree to be analyzed to determine whether a given clock net is the best clock net for connection to user-specified clock instance being added. This not possible through a manual restructuring. As mentioned above, a typical post-CTS clock tree in an integrated circuit may include a very large number of candidate clock nets for possible connection to the user-specified clock instance. Consideration of each of these clock nets, which may be a very large number, is not possible manually. In different embodiments of the present disclosure, the clock net that is considered the best or optimal clock net for connecting to the user-specified clock instance may vary. This is true because in different embodiments the algorithm executed by the API in operation 506 may utilize different metrics in determining the optimal clock net for connection.

FIG. 6B is a logical diagram of the post-CTS clock tree 600b corresponding to the post-CTS clock tree 600a of FIG. 6A. FIG. 6B illustrates that connecting the clock sink CS being added based on the inputs in the request provided by the designer in operation 504 results in a large skew SK between this clock sink CS being added and all the other clock sinks CS in the post-CTS clock tree 600b. A clock node 606b, which corresponds to the clock node 606a of FIG. 6A, of the clock sink CS being added is initially connected to the driving node O at the output of the uppermost buffer B receiving the clock signal CLK. This clock node 606a, 606b of the user-specified clock instance being added may be referred to as the user-specified clock instance USCI in the present description. Connecting this clock sink CS in this way results in a much smaller insertion delay ID for this clock sink CS relative to the other clock sinks in the post-CTS clock tree 600b. Large differences in insertion delays ID among clock sinks CS results in large skews SK among clock sinks CS in the clock tree 600b, which is undesirable.

Figure 7B:
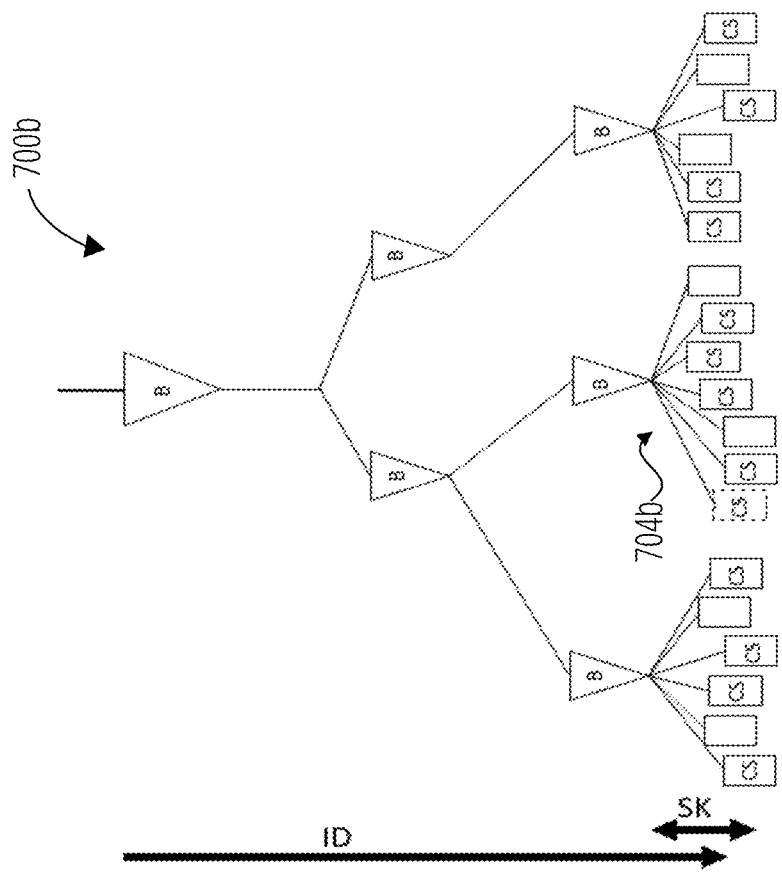
FIG. 7B is a logical diagram of the restructured post-CTS clock tree of FIG. 7A showing the improved skew of the restructured clock tree including the added user-specified clock instance in accordance with some embodiments of the present disclosure.
Figure 7A:
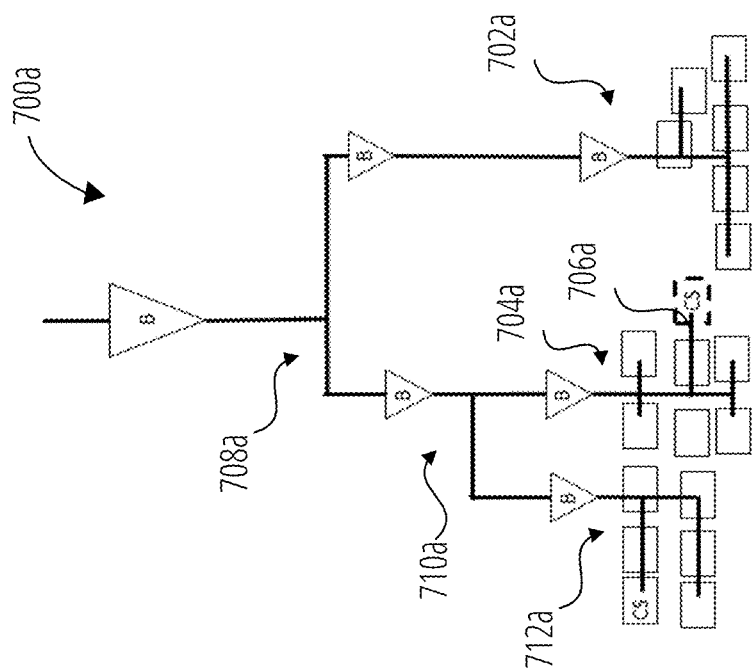
FIG. 7A is a plan view of the physical layout of the restructured of post-CTS clock tree of FIG. 6A to include a user-specified clock instance in accordance with some embodiments of the present disclosure.

FIGS. 7A and 7B illustrate an example of a restructuring of the post-CTS clock tree 600a of FIG. 6A through the process 500 of FIG. 5 in accordance with some embodiments of the present disclosure. FIG. 7A is a plan view of the physical layout of a post-CTS clock tree 700a and corresponds to the clock tree 600a of FIG. 6A after restructuring of the clock tree 600a through the process 500 of FIG. 5. The post-CTS clock tree 700a includes clock nets 702a, 704a, 708a, 710a and 712a. A clock node 706a of the user-specified clock instance being added, namely the clock sink CS illustrated with dashed lines, is connected to clock net 704a. Connecting the clock sink CS being added to clock net 704a greatly reduces the skew of this clock sink. This is shown in FIG. 7B, which is a logical diagram of a post-CTS clock tree 700b corresponding to the post-CTS clock tree 700a of FIG. 7A. The clock net 704b in FIG. 7B corresponds to clock net 704a of FIG. 7A. When FIG. 7B is compared to FIG. 6B, the much smaller skew of the restructured post-CTS clock tree 700b is seen relative to the post-CTS clock tree 600b in which the clock sink CS being added is connected to clock net 608b as initially specified by the designer.

Figure 8:
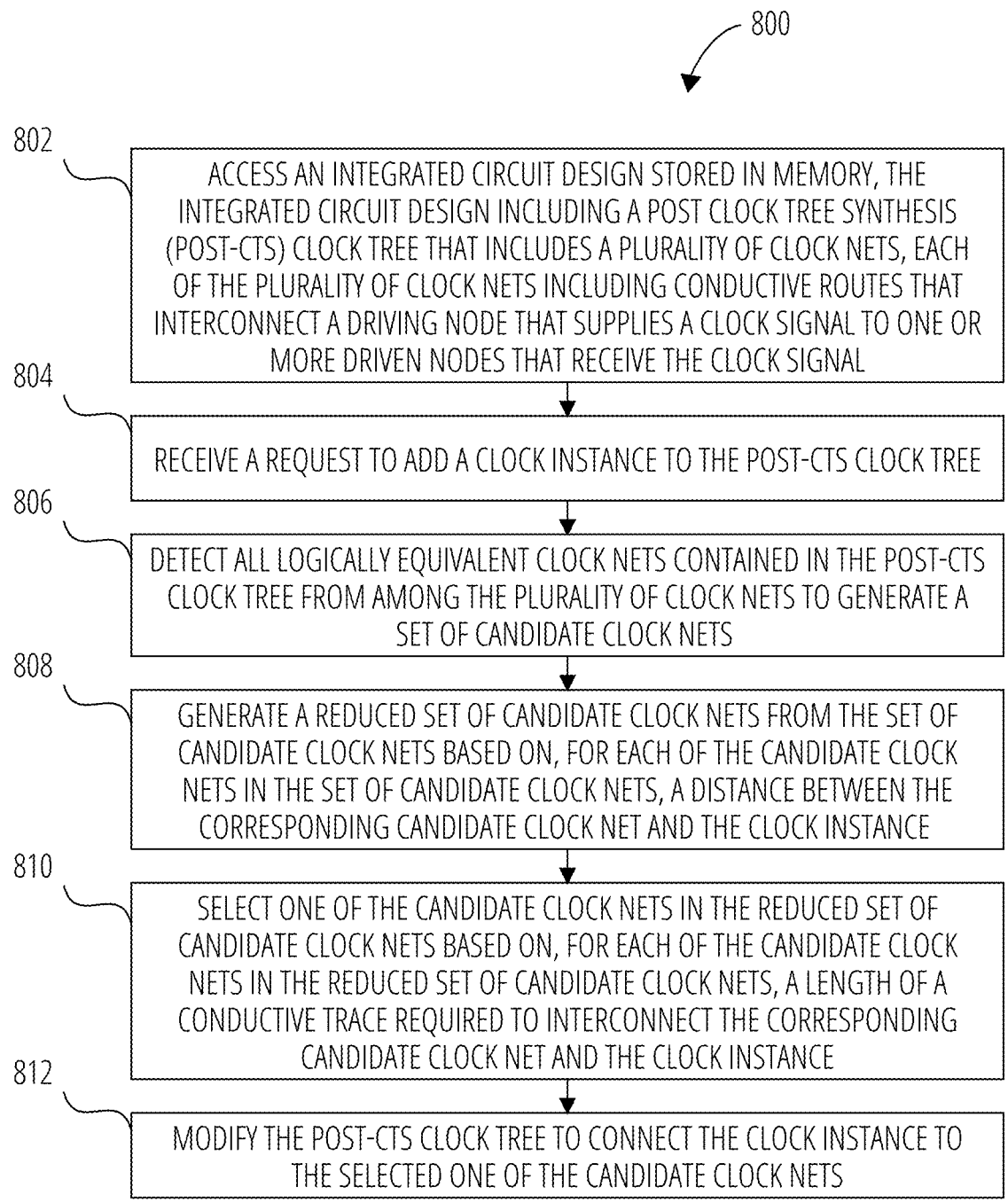
FIG. 8 is a flowchart illustrating in more detail an algorithm for restructuring a post-CTS clock tree to include a user-specified clock instance in accordance with some embodiments of the present disclosure.

FIG. 8 is a flowchart illustrating in more detail a method or process 800 implementing an algorithm for restructuring a post-CTS clock tree to include a user-specified clock instance in accordance with some embodiments of the present disclosure. The process 800 begins in operation 802, and accesses an integrated circuit design stored in memory. The integrated circuit design includes a post-CTS clock tree having a plurality of clock nets. Each of the plurality of clock nets includes conductive routes that interconnect a driving node that supplies a clock signal to one or more driven nodes that receive the clock signal. The clock node of the user-specified clock instance may be connected to certain clock nets in the post-CTS clock tree to receive the clock signal being provided on that clock that by the corresponding driven node. The clock nets to which the user-specified clock instance may be connected are referred to as "logically equivalent clock nets." Clock nets generally, and logically equivalent clock nets specifically, are discussed in more detail below with reference to FIG. 9-16. In operation 804, the process 800 receives a request to add a clock instance to the post-CTS clock tree. The request may be a request to add a new clock instance to the post-CTS clock tree or a request to relocate an existing clock instance in the post-CTS clock tree. The request from the user, via the API, received in operation 804 was described in detail above with regard to operation 504 in the process 500 of FIG. 5. The clock instance may be a clock gate, a clock sink, a clock node, a plurality of clock sinks, a plurality of clock nodes, or a plurality of clock sinks and a plurality of clock nodes, or any combination of these elements. For example, in the example embodiments described below the user-specified clock instance being added to the post-CTS clock tree is a clock sink such as a flip-flop.

From operation 804, the process 800 proceeds to operation 806 and detects all logically equivalent clock nets contained in the post-CTS clock tree from among the plurality of clock nets contained in the post-CTS clock tree to generate a set of candidate clock nets. A logically equivalent clock net is a clock net in a post-CTS clock tree that is a candidate for connection to the user-specified clock instance being added to the clock tree. Logically equivalent clock nets may accordingly be referred to as candidate clock nets in the present description. In some embodiments, detecting all logically equivalent clock nets contained in the post-CTS clock tree includes defining clock polarity, clock gating, power domain, module, and preservation of ports parameters in relation to the user-specified clock instance being added to the post-CTS clock tree. The operation 804 utilizes these parameters in detecting logically equivalent clock nets in the post-CTS clock tree. These parameters as well as utilization of these parameters in operation 806 is described in more detail below with reference to FIGS. 9 and 10.

After operation 806, the process 800 proceeds to operation 808 and generates a reduced set of candidate clock nets from the set of candidate clock nets. The reduced set of candidate clock nets is based on, for each of the candidate clock nets in the set of candidate clock nets generated in operation 806, a distance between the corresponding candidate clock net and the user-specified clock instance. A longer distance between the user-specified clock instance and the candidate clock net means one or more conductive traces that would be required to interconnect the two must be longer. Longer conductive traces result in increased insertion delay ID and thus potentially increased skew SK for elements contained in the user-specified clock instance. Determining the distance between the corresponding candidate clock net and the user-specified clock instance is described in more detail below with reference to FIG. 12.

From operation 808 the process 800 proceeds to operation 810 and selects one of the candidate clock nets in the reduced set of candidate clock nets. The selected one of the candidate clock nets is the clock net to which the user-specified clock instance will actually be connected in the restructured post-CTS clock tree. The selected candidate clock net is based on, for each of the candidate clock nets in the reduced set of candidate clock nets, a length of one or more conductive trace required to interconnect the corresponding candidate clock net and the user-specified clock instance. The determination in operation 810 regarding the length of conductive traces is similar to the determination made in operation 808. The determination in operation 808 of the distance provides a general estimate or approximation of the distance between the candidate clock net and the user-specified clock instance. In contrast, the determination in operation 810 utilizes an accurate measure of the length of conductive traces that would actually need to be routed within the post-CTS clock tree to interconnect the candidate clock net and the user-specified clock instance. Determining the length of conductive traces in operation 810 described in more detail below with reference to FIGS. 13-16. Finally, after operation 810 the process 800 proceeds to operation 812 and modifies or restructures the post-CTS clock tree to connect the user-specified clock instance to the selected one of the candidate clock nets from operation 810. This restructuring of the post-CTS clock tree to include the user-specified clock instance in operation 812 may also include resizing, moving, and clustering of one or more of the existing clock nets in the post-CTS clock tree to thereby modify the post-CTS clock tree to accommodate the user-specified clock instance.

Figure 9:
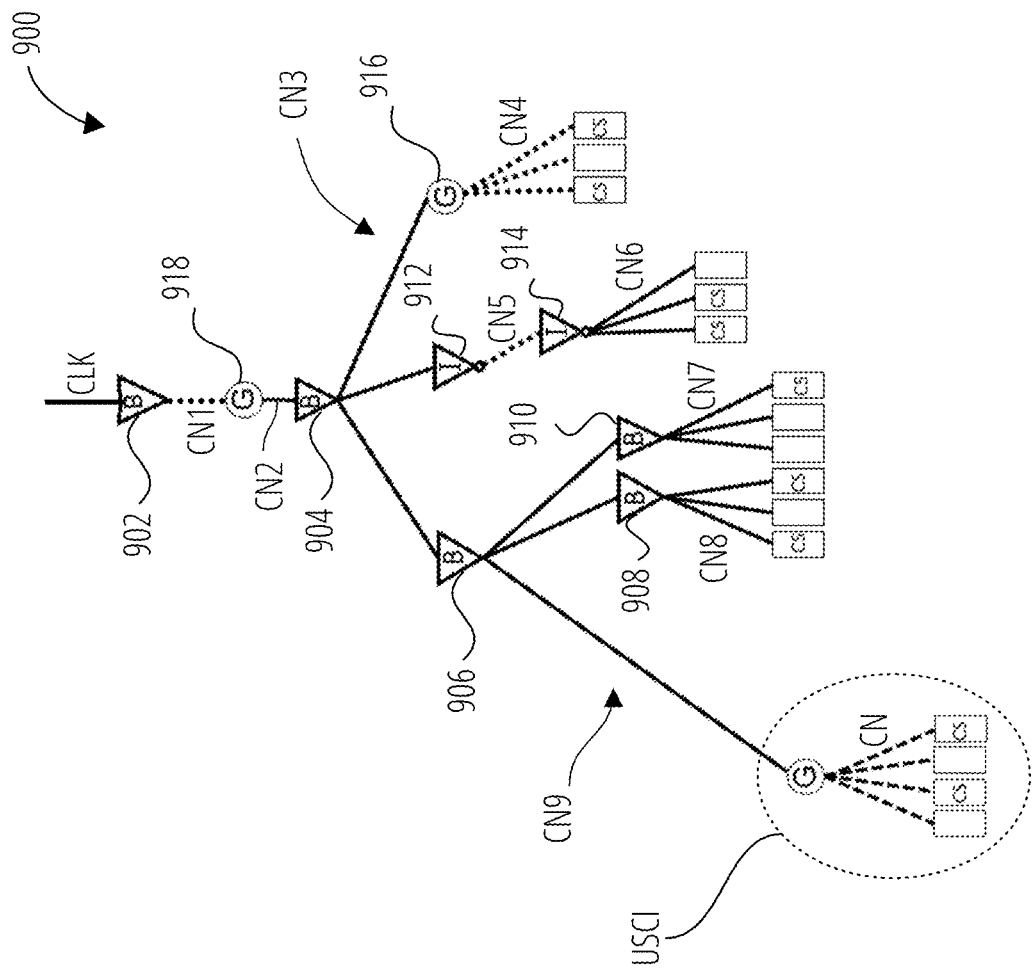
FIG. 9 is a logical diagram of a simplified example of a post-CTS clock tree illustrating a post-CTS addition to the clock tree along with logically equivalent clock nets within the clock tree to which the post-CTS addition may be connected in accordance with some embodiments of the present disclosure.

FIG. 9 is a logical diagram of an example of a simplified post-CTS clock tree 900 illustrating addition of a user-specified clock instance USCI to the clock tree. The post-CTS clock tree 900 includes a plurality of buffers 902-910 along with two inverters 912, 914, clock gates 916, 918, and clock sinks CS interconnected as shown, and includes nine clock nets CN1-CN9. Only selected ones of the clock sinks CS are labeled to simplify the figure. The user-specified clock instance USCI is shown initially connected to the clock net CN9 in the example of FIG. 9. The clock instance USCI includes a clock node in the form of a clock gate G along with a plurality of clock sinks CS connected through a clock net CN to the clock gate. The clock net CN is illustrated through dashed lines to indicate that this clock net is part of the clock instance. As will be understood by those skilled in the art, clock gating is a technique utilized to reduce dynamic power consumption of the clock tree by eliminating the application of the propagated CLK signal to certain components in the clock tree when these components are not in use. The clock gate G may, for example, be a simple two-input AND gate with one input receiving the propagated CLK signal and the other input receiving a clock gating signal. Thus, when the clock gating signal enables the AND gate G, the CLK signal is supplied through the AND gate to drive the clock sinks CS connected through the clock net CN to the output of the AND gate. Conversely, when the clock gating signal disables the AND gate G, the propagated CLK signal is not supplied through the AND gate and accordingly does not drive the clock sinks CS.

As mentioned above, in some embodiments logically equivalent clock nets contained in the post-CTS clock tree are detected by considering clock polarity, clock gating, power domain, module, and preservation of ports parameters, as will now be described in more detail with reference to FIG. 9. A clock net in a clock tree has one of two complementary polarities corresponding to the two levels of the binary CLK signal (i.e., true level and false or complementary level) propagating in the clock net. In the post-CTS clock tree 900, the clock net CN5 is connected to the output of inverter 912 and thus the "clock polarity" of the clock net CN5 is the complement of the clock nets CN2-CN4 and CN6-CN9. Accordingly, because the clock net CN5 has a complementary or opposite polarity of the clock net CN9, which defines the clock polarity of the clock instance USCI, the clock net CN5 is not a logically equivalent clock net. The clock net CN5 is represented with dotted lines to indicate that it is a not a logically equivalent clock net. In the post-CTS clock tree 900, the clock net CN6 is a logically equivalent clock net based on clock polarity even though connected to an output of inverter 914. This is true because relative to the clock net CN9, which is connected to the user-specified clock instance USCI, the propagating clock CLK signal has been inverted twice via the inverters 912 and 914. The CLK signal in clock net CN6 accordingly has the same polarity as the propagating clock signal in clock net CN9. Clock net CN6 is represented in FIG. 9 through solid lines since it is a logically equivalent clock net.

Another parameter considered in detecting logically equivalent clock nets is clock gating. The operation of clock gating was described above, but in the context of detecting logically equivalent clock nets, an equivalent clock net cannot cross a clock-gating boundary. Each clock gate defines a clock-gating boundary. A logically equivalent clock net cannot cross a clock-gating boundary. For example, in FIG. 9 the user-specified clock instance USCI is in a clock gating boundary defined by the clock gate 918. As a result, the clock net CN1 is not a logically equivalent clock net, which is illustrated by the dotted lines for clock net CN1 in FIG. 9. If the user-specified clock instance USCI was connected to clock net CN1, the user-specified clock instance could be clocked even when the clock gate 918 is disabled to prevent clocking of components in the clock gating boundary defined by clock gate 918. Another example of a clock net that is not a logically equivalent clock net for the user-specified clock instance USCI due to the crossing of a clock gating boundary is clock net CN4. The clock net CN4 is in a different clock gating domain or crosses a clock domain boundary defined by the clock gate 916. Accordingly, the clock net CN4 is not a logically equivalent clock net due to the crossing of a clock gating boundary defined by the clock gate 916. Clock net CN4 is represented through dotted lines to indicate it is not a logically equivalent clock net for the user-specified clock instance USCI.

Another parameter considered in detecting logically equivalent clock nets in some embodiments of the present disclosure is a power domain parameter. A power domain is a collection or group of components in an integrated circuit that receive the same power supply, meaning the components are coupled to the same supply voltage plane and reference voltage plane in the integrated circuit. Power domains in an integrated circuit typically may be independently switchable ON and OFF during operation of the integrated circuit, and different power domains may supply voltages having different levels to the corresponding components. Thus, a user-specified clock instance being physically positioned in one clock domain may generally not to be connected to a clock net in another power domain since components in different power domains may be utilizing different voltage levels. In embodiments, each clock net has a power domain parameter indicating the power domain containing the clock net. A clock net that is in a different power domain than the power domain containing the user-specified clock instance is not a logically equivalent clock net in some embodiments of the present disclosure.

Another parameter that may be considered in detecting logically equivalent clock nets in some embodiments of the present disclosure is a module parameter. A module is a logical grouping of components forming a portion of a design of an IC. Modules allow for replication of this group of components as required throughout the design merely by adding the corresponding module as required. Where the user-specified clock instance is being added to particular module contained in the design of the post-CTS clock tree, clock nets in other modules may, or may not, be logically equivalent clock nets. For example, a given module may be marked or have a status of "preserved" such that no changes may be made inside of this module. Clock nets in such a preserved module are not logically equivalent clock nets and accordingly must be excluded as potential clock nets for implementing changes to the post-CTS clock tree.

Another parameter that may be considered in detecting logically equivalent clock nets in some embodiments of the present disclosure is a preservation of ports parameter. Ports represent inputs and outputs of module. As some modules may be designated "preserved," the same is true of ports since a designer may want some ports to persist throughout the implementation, such as for testing purposes. When considering the path from clock root to one or more clock sinks, all the inversions, clock gates, logic and preserved ports that the clock signal passes through may be seen. For such a path, we must not change what that path passes through such that if there is a preserved port between clock root and the one or more clock sinks then that preserved port must persist. Accordingly, a clock node may not be re-attached to another clock net if doing so would mean that a preserved port is now missing from the path. In other words, when looking for candidate clock nets preserved ports may not be jumped across in the same as described above in relation to jumping across clock gates or single-inverters.

Figure 10:
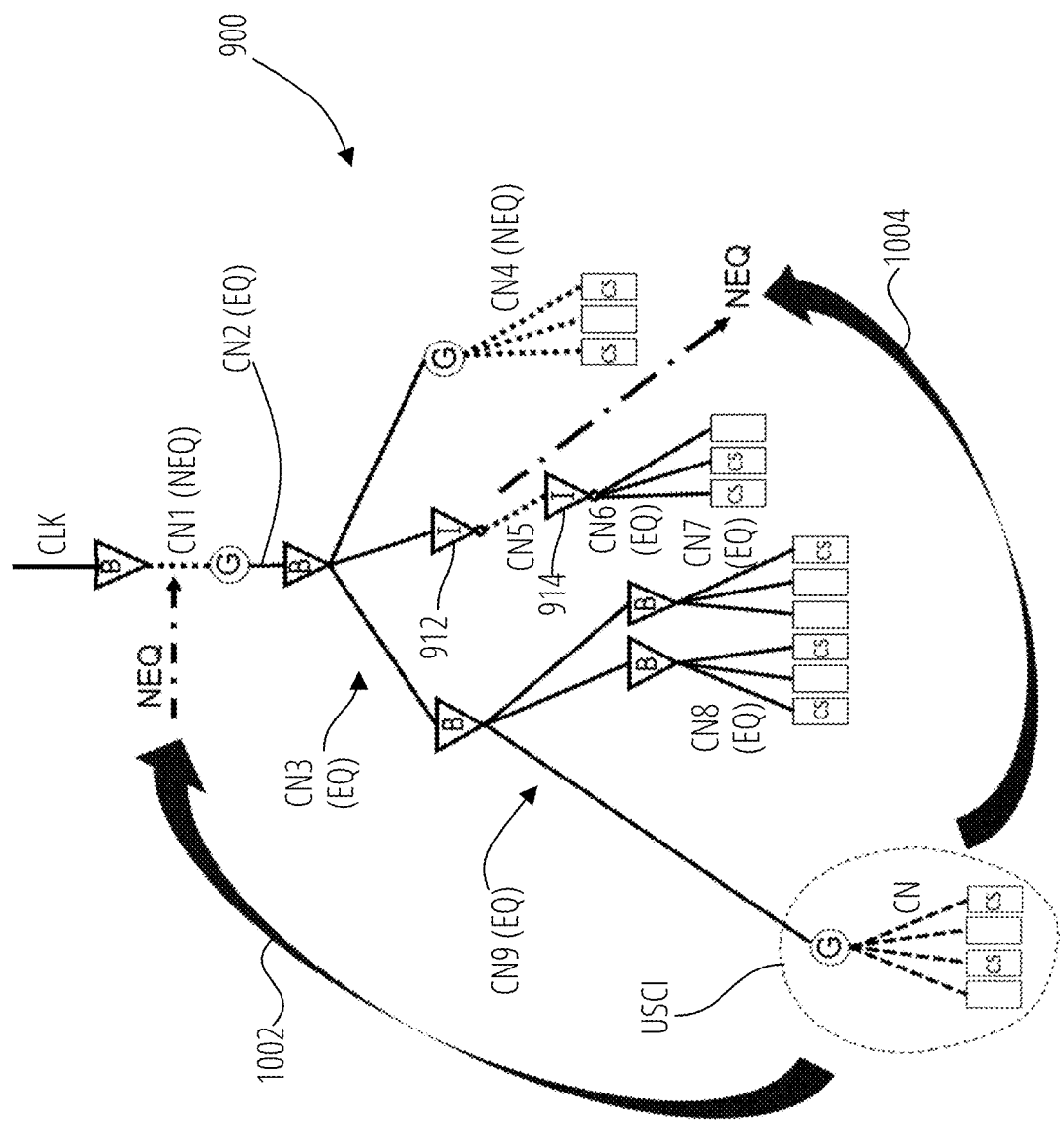
FIG. 10 illustrates several logically non-equivalent clock nets within the post-CTS clock tree of FIG. 9 to which the post-CTS addition may not be connected in accordance with some embodiments of the present disclosure.

FIG. 10 illustrates the clock nets that are not logically equivalent clock nets for the user-specified clock instance USCI within the post-CTS clock tree 900 of FIG. 9 in accordance with some embodiments of the present disclosure. These clock nets that are not logically equivalent are labeled as non-equivalent NEQ clock nets in FIG. 10. The clock nets CN1 and CN4 are NEQ clock nets due to the clock gating parameter and clock net CN5 is a NEQ clock net due to the clock polarity parameter, as discussed above in relation to FIG. 9. All the other clock nets CN2, CN3, CN6, CN7, CN8 and CN9 are logically equivalent clock nets, as indicated in FIG. 10 through the "(EQ)" indicator shown for each of these clock nets. The user-specified clock instance USCI may not be connected to any of clock nets CN1, CN4 or CN5 when restructuring the clock tree but may be connected to any of the clock nets CN2, CN3, CN6, CN7, CN8. The clock instance USCI is initially connected to clock net CN9 as shown pursuant to the initial request from the designer to add this clock instance to the clock tree 900, as discussed above. The clock nets CN1, CN4, and CN5 are not candidate clock nets for connection of the clock instance USCI. FIG. 10 illustrates this concept for the clock nets CN1 and CN5 through respective arrows 1002, 1004 from the user-specified clock instance USCI to each of these clock nets. The user-specified clock instance may not be connected to either of the NEQ clock nets CN1, CN4. The same is true for NEQ clock net CN4 as mentioned above although an arrow for this clock net is shown in FIG. 10 to simply the figure.

Figure 11:
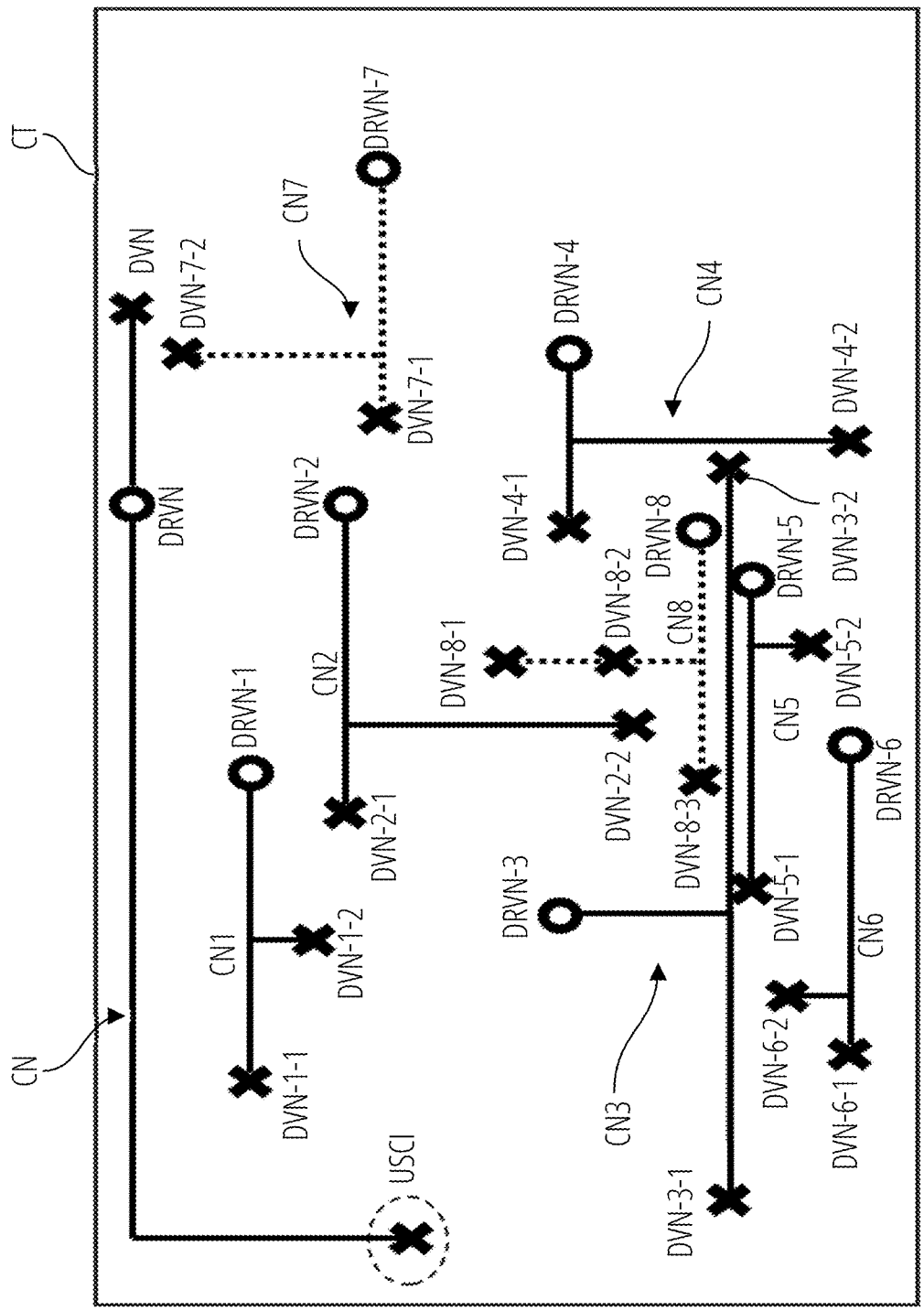
FIG. 11 is a plan view of a physical layout of a simplified post-CTS clock tree illustrating several logically equivalent clock nets and logically non-equivalent clock nets contained within the clock tree and showing a user-specified clock instance USCI being added to the clock tree in accordance with some embodiments of the present disclosure.

FIG. 11 is a plan view of a physical layout of a simplified post-CTS clock tree CT illustrating several logically equivalent clock nets and logically non-equivalent clock nets contained within the clock tree and showing a user-specified clock instance USCI being added to the clock tree in accordance with some embodiments of the present disclosure. The operations 806-808 in the process 800 will now be described in more detail with reference to FIGS. 11-16 in accordance with some embodiments of the present disclosure. FIG. 11 illustrates a greatly simplified post-CTS clock tree CT containing only nine clock nets in CN and CN1-CN8 in order to simplify the figure while allowing a description of the operations 806-810 in more detail according to some embodiments of the present disclosure. The user-specified clock instance (not shown in FIG. 11) includes the user-specified clock instance USCI, which is shown initially connected to the clock net CN. As described above, each clock net includes conductive traces or routes that interconnect a driving node DRVN to one or more driven nodes DVN, where the driving node supplies a clock signal that propagates over the conductive traces to the one or more driven nodes. FIG. 11 illustrates the conductive traces and corresponding driving node DRVN and driven nodes DVN and for each of the clock nets CN, CN1-CN8. Each driving node DRVN is represented with an "O" while each driven node is represented with an "X". This notation for driving nodes DRVN and driven nodes DVN was discussed above in relation to the description of FIGS. 6A and 6B.

Each clock net CN, CN1-CN8 includes a driving node DRVN and one or more driven nodes DVN, with numbers appended to each of these node designations to indicate the corresponding clock net to which the node belongs. For example, the clock net CN includes the driving node DRVN and two driven nodes, a driven node DVN and a driven node corresponding to the user-specified clock instance USCI. The clock net CN1 includes a driving node DRVN-1 and two driven nodes DVN-1-1, DVN-1-2. The first of the two appended numerals indicates the clock net to which the node belongs while the second number specifically identifies the particular driven node for that clock net.

In the example post-CTS clock tree CT of FIG. 11, the clock tree includes six logically equivalent clock nets CN1-CN6, not including the clock that CN to which the user-specified clock instance USCI is initially connected pursuant to the request to add a user-specified clock instance to the post-CTS clock tree CT (see operation 804 in FIG. 8). The conductive traces in each of these logically equivalent clock nets CN1-CN6 are represented with solid lines. The post-CTS clock tree CT also includes two clock nets CN7, CN8 that are not logically equivalent clock nets (i.e., non-equivalent clock nets as discussed above with reference to FIGS. 9 and 10), with these clock nets being represented with dotted lines in FIG. 11. In operation 806 (FIG. 8) all logically equivalent clock nets in the post-CTS clock tree CT are detected. As part of the operation 806, the clock nets CN7, CN8 may be determined as not being logically equivalent clock nets based on any of the parameters considered above, namely clock polarity, clock gating, power domain, module, and preservation of ports parameters, as well as additional parameters in accordance with some embodiments of the present disclosure.

Figure 12:
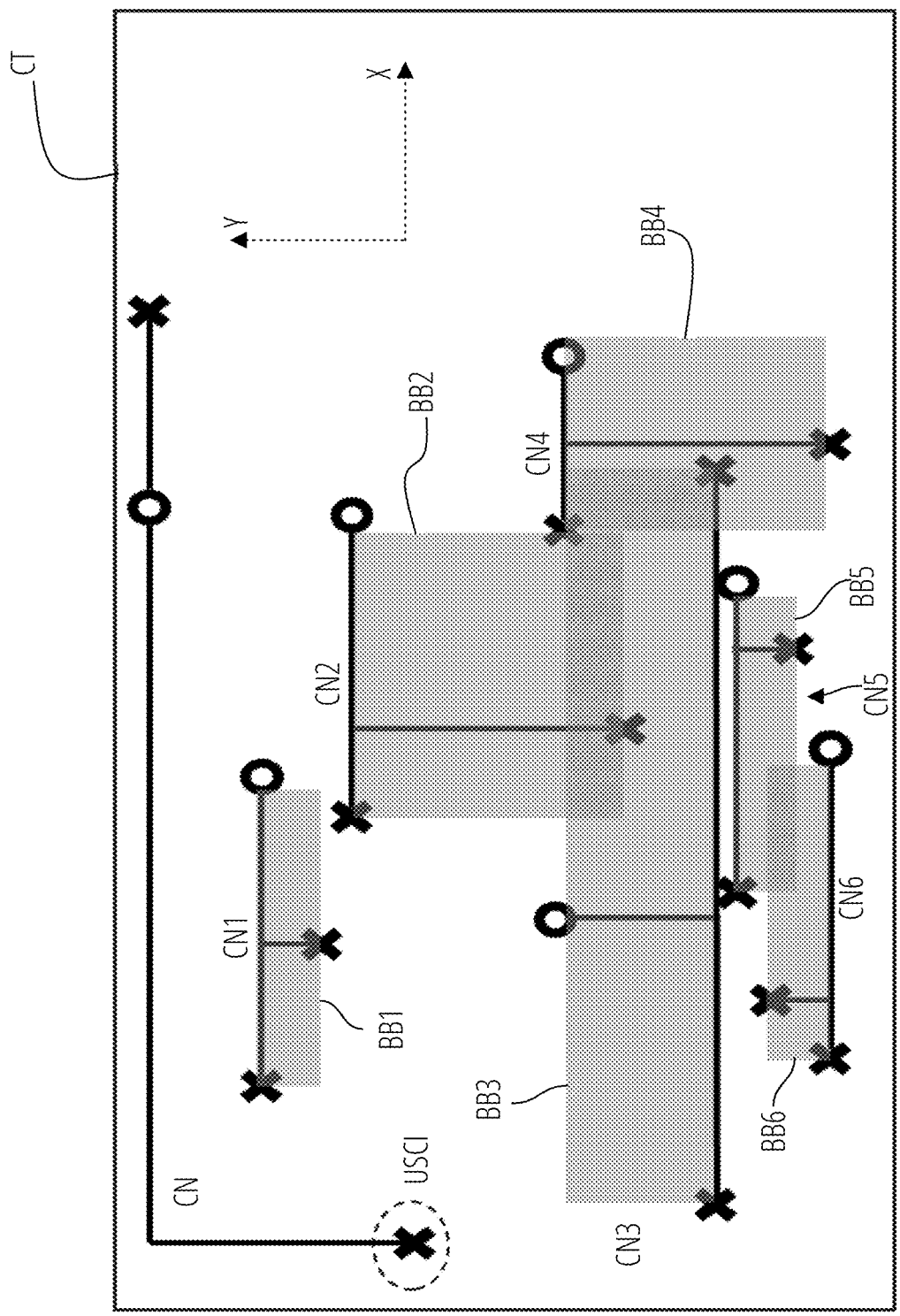
FIG. 12 illustrates the physical layout of the simplified post-CTS clock tree of FIG. 11 in which the logically non-equivalent clock nets are not shown and which also shows a bounding box defined for each candidate logically equivalent clock net in accordance with some embodiments of the present disclosure.

Referring now to FIG. 12, the operation 808 in accordance with some embodiments of the present disclosure will now be described in more detail. FIG. 12 shows the post-CTS clock tree CT of FIG. 11 with the non-logically equivalent clock nets CN7, CN8 removed since these clock nets are not options for connecting the user-specified clock instance USCI of the clock instance being added to the post-CTS clock tree. In addition, FIG. 12 also illustrates a bounding box BB1-BB6 defined for each of the candidate clock nets CN1-CN6 to which the user-specified clock instance USCI may be connected. Each bounding box BB1-BB6 defines an area occupied by the corresponding candidate clock net CN1-CN6 that includes the driving node DRVN and all of the one or more driven nodes DVN of the clock net. In the present description, when referring generally to any of the bounding boxes BB1-BB6, clock nets CN1-CN6, or the driving and driven nodes of these clock nets the numbers may be omitted, with numbers only being included when referring to a specific clock net, driving node, or driven node. The area occupied by each bounding box BB is an area in an XY-plane of the physical layout of the post-CTS clock tree CT, with the Y-axis and X-axis shown in FIG. 12. Each bounding box BB1-BB6 accordingly indicates an area occupied by the driving node DRVN in the XY-plane that includes all the driven node DVRN and all the driving nodes DRV contained in the clock net.

The bounding boxes BB1-BB6 of the clock nets CN1-CN6 are utilized in the operation 808 (FIG. 8) to determine a distance between the corresponding candidate clock net and the user-specified clock instance USCI. As previously mentioned, longer conductive traces required to interconnect the user-specified clock instance USCI and a clock net are in general undesirable as longer conductive traces may result in larger insertion delay ID and skew SK of the user-specified clock node, and thus generally may present timing issues for the post-CTS clock tree CT. Thus, the bounding boxes BB are utilized in operation 808 to detect clock nets that are physically close to the user-specified clock instance USCI. In some embodiments of the present disclosure, the operation 808 detects a Manhattan or rectilinear distance between the user-specified clock instance USCI and the nearest point of the bounding box BB for each of the candidate clock nets CN. A Manhattan or rectilinear distance is a distance between two points measured along axes that are at right angles to one another, namely the Y-axis and X-axis in the XY-plane as shown in FIG. 12. The number of candidate clock nets CN is reduced utilizing the detected distances between the user-specified clock instance USCI and the corresponding clock net. In this way, clock nets CN having shorter detected distances are retained to form a reduced set of candidate clock nets CN based on these detected distances in operation 808.

Figure 13B:
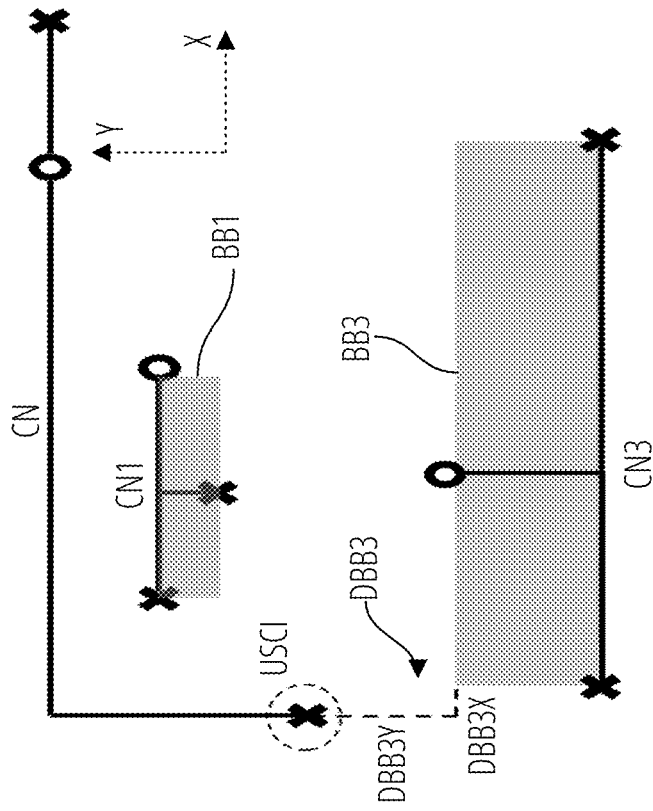
FIG. 13B illustrates measuring a distance between the user-specified clock node and the bounding box of a second one of the candidate logically equivalent clock nets of FIG. 12 in accordance with some embodiments of the present disclosure.
Figure 13A:
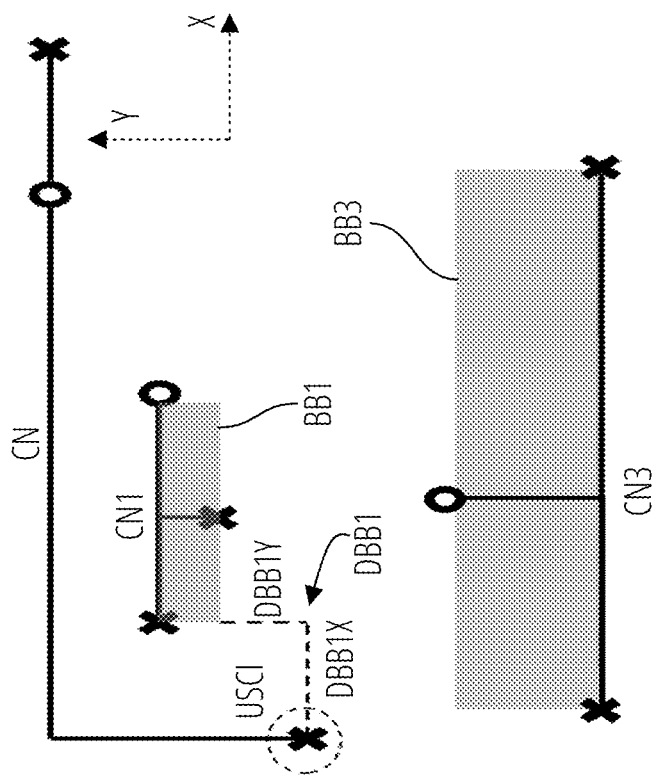
FIG. 13A illustrates measuring a distance between the user-specified clock node and the bounding box of a first one of the candidate logically equivalent clock nets of FIG. 12 in accordance with some embodiments of the present disclosure.

FIGS. 13A and 13B illustrate in more detail the operation 808 in the process 800 of FIG. 8 in generating the reduced set of candidate clock nets CN in accordance with some embodiments of the present disclosure. In the example of FIGS. 13A, 13B only two clock nets CN1 and CN3 from the candidate clock nets CN1-CN6 illustrated in FIG. 12 are shown merely to simplify the figure as well as the corresponding description of the operation 808 in generating the reduced set of candidate clock nets CN. The clock nets CN1, CN3 are the top two candidates (i.e., have bounding boxes BB1, BB3 nearest to the user-specified clock instance USCI). In execution of the process 800, the operation 808 would actually perform the process described for the clock nets CN1, CN3 shown in FIGS. 13A and 13B for each of the candidate (logically equivalent) clock nets CN of FIG. 12. FIG. 13A illustrates measuring a distance between the user-specified clock instance USCI and the bounding box BB1 of the candidate logically equivalent clock net CN1 in accordance with some embodiments of the present disclosure. FIG. 13B illustrates measuring a distance between the user-specified clock instance USCI and the bounding box BB3 of the clock net CN3 of FIG. 12 in accordance with some embodiments of the present disclosure.

Referring to FIG. 13A, a distance DBB1 between the user-specified clock instance USCI and the bounding box BB1 of the clock net CN1 is measured or detected. The distance DBB1 includes a distance DBB1X along the X-axis and a distance DBB1Y along the Y-axis. The detected distance DBB1 is equal to the sum of these two distances along the X-axis and Y-axis, namely DBB1=(DBB1X+DBB1Y). In FIG. 13B, a distance DBB3 between the user-specified clock instance USCI and the bounding box BB3 of the clock net CN3 is measured or detected. The distance DBB3 includes a distance DBB3X along the X-axis and a distance DBB3Y along the Y-axis. The detected distance DBB3 is equal to the sum of these two distances along the X-axis and Y-axis, namely DBB3=(DBB3X+DBB3Y). The operation 808 generates the reduced set of candidate clock nets CN based on the measured or detected distances DBB between the user-specified clock instance USCI and each of the bounding boxes, with only bounding boxes having the shortest distances being included in the reduced set of candidate clock nets CN. The specific number of clock nets CN in the reduced set may vary in different embodiments of the present disclosure. In the example of FIGS. 13A and 13B, each of the candidate clock nets CN1, CN3 has a relatively short distance DBB1, DBB3 between the bounding box BB1, BB3 and the user-specified clock instance USCI. The distance is DBB3 is less than DBB1, meaning between the two clock nets CN1, CN3, the clock net CN3 would be preferred if the selection was based on these distances alone. This is not the case in some embodiments of the present disclosure, however, as will now be described in more detail with reference to FIGS. 14A, 14B and the operation 810 in accordance with some embodiments of the present disclosure.

FIGS. 14A and 14B illustrate in more detail the operation 810 in the process 800 of FIG. 8 in selecting one of the candidate clock nets CN for connecting to the user-specified clock instance USCI based on a length a conductive trace length LCT of one or more conductive traces required to interconnect the clock node and the corresponding clock net in accordance with some embodiments of the present disclosure. In operation 810, the actual length LCT of conductive traces between the driving node DRVN of each of the candidate clock nets CN and the user-specified clock instance USCI is determined. As mentioned in relation to FIGS. 13A, 13B, only the top two candidate logically equivalent clock nets CN1, CN3 in the reduced set of candidate clock nets generated in operation 808 are illustrated in FIGS. 14A, 14B. The operation 810 would actually perform the process that will now be described for the clock nets CN1, CN3 in FIGS. 14A, 14B for each of the candidate (logically equivalent) clock nets CN in the reduced set of candidate clock nets generated in operation 808.

In some embodiments according to the present disclosure, the operation 810 performs a Steiner routing estimate for each of the candidate clock nets CN1, CN3. The Steiner routing estimate provides a potential routing of actual conductive traces that could be utilized to connect the user-specified clock instance USCI to each of the candidate clock nets CN1, CN3. Each of the clock nets CN1, CN3 includes conductive traces and to connect the clock net to the clock instance USCI one or more conductive traces must be routed between the clock node and one of these conductive traces in the clock net. This is illustrated for the clock net CN1 in FIG. 14A. A possible routing pattern of conductive traces illustrated in FIG. 14A connects the clock instance USCI to the conductive trace associated with the driven node DVN-1-2 in the clock net CN1. The routing pattern is illustrated with dashed lines in FIG. 14A and is a rectilinear routing pattern including conductive traces parallel to the X-axis and to the Y-axis.

Once the possible routing pattern between the clock net CN1 and the user-specified clock instance USCI has been determined, the operation 810 calculates a conductive trace length LCT1 for the routing pattern. In some embodiments of the present disclosure, the length LCT1 is the length of conductive traces between the driving node DRVN1 of the clock net CN1 and the user-specified clock instance USCI. This length LCT1 may be viewed as a source-to-sink conductive trace length, where the driving node DRVN1 is the "source node" for the propagated clock signal in the clock net CN1 and the user-specified clock instance USCI is a "sink node" or driven node for this clock signal. The length LCT1 includes conductive traces having a length LCTx-1, a length LCTy-1, and LCTx-2 as shown. The conductive trace of length LCTx-1 is an entirely new conductive trace that must be routed. The conductive trace LCTy-1 includes a new portion and the existing conductive trace connecting to driven node DVN-1-2, where the new portion is the portion between the trace of length LCTx-1 and the driven node DVN-1-2. Finally, the length LCT1 includes a conductive trace of length LCTx-2, which is portion of an existing conductive trace in the clock net CN1 that is parallel to the X-axis. As seen from FIG. 14A, the length LCT1=(LCTx-1+LCTy-1+LCTx-2).

The same process is repeated for candidate clock net CN3, with a possible routing pattern interconnecting the clock net CN3 and the user-specified clock instance USCI shown in FIG. 14B. A calculated trace length LCT3 in this situation is the length of conductive traces between the driving node DRVN3 of the clock net CN3 and the user-specified clock instance USCI. The length LCT3 includes conductive traces of lengths LCTy-1, LCTx-1, and LCTy-2 as shown through dashed lines in FIG. 14B. Each of the trace lengths LCTx-1 and LCTy-2 correspond to portions of the existing conductive traces in the clock net CN3 while trace length LCTy-1 corresponds to an entirely new conductive trace interconnecting the user-specified clock instance USCI and the driven node DVN-3-1 of the clock net CN3. Once the lengths LCT1, LCT3 for the candidate clock nets CN1, CN3 have been measured or detected, the operation 810 selects the candidate clock net having the shortest length, which is the clock net CN1 in the example of FIGS. 14A, 14B. In the present description, the "length" of conductive traces is a length of one or more conductive traces between a source node of candidate clock net and a clock node of the user-specified clock instance.

In the example embodiment of FIGS. 14A, 14B, each of the measured conductive trace lengths LCT1, LCT3 is a source-to-sink length between the driving node DRVN of the corresponding clock net CN and the user-specified clock node. This metric is utilized in selecting the candidate clock net CN for connection to the user-specified clock instance USCI in some embodiments of the present disclosure. Utilization of this metric has the advantage of selecting the clock net CN having the shortest source-to-sink conductive trace length, which will reduce the insertion delay ID and skew SK of the propagated clock signal applied to the user-specified clock instance USCI. Reducing insertion delay ID and skew SK helps reduce the likelihood of potential timing issues created by connecting the user-specified clock instance USCI to the selected clock net CN. Alternative metrics may, however, be utilized in some embodiments of the present disclosure. For example, in some embodiments a total wire length metric may be utilized in selecting the candidate clock net CN to connect to the user-specified clock instance USCI. When the total wire length metric is utilized, the total length of conductive traces in each clock net CN along with lengths of new conductive traces to the user-specified clock instance USCI are calculated. The candidate clock net CN having the smallest total length of conductive traces is then selected in operation 810 as the clock net to connect to the user-specified clock instance USCI. Other metrics for selecting a candidate clock net CN may be utilized in some embodiments of the present disclosure.

Figure 15:
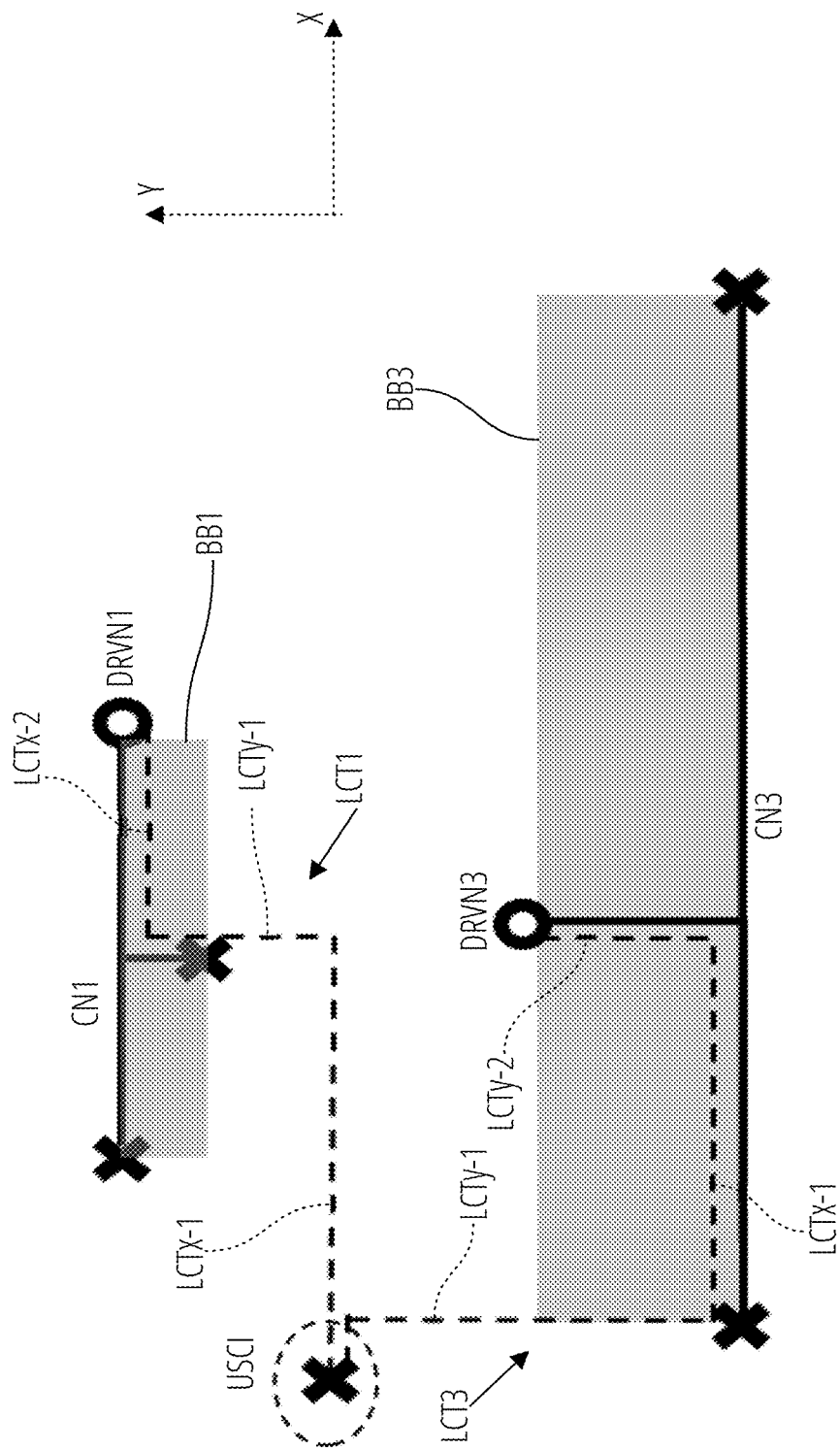
FIG. 15 illustrates both the conductive trace lengths of FIGS. 14A and 14B for comparison to show that the trace length to the upper clock net is shorter than the trace length to the lower clock net.
Figure 16:
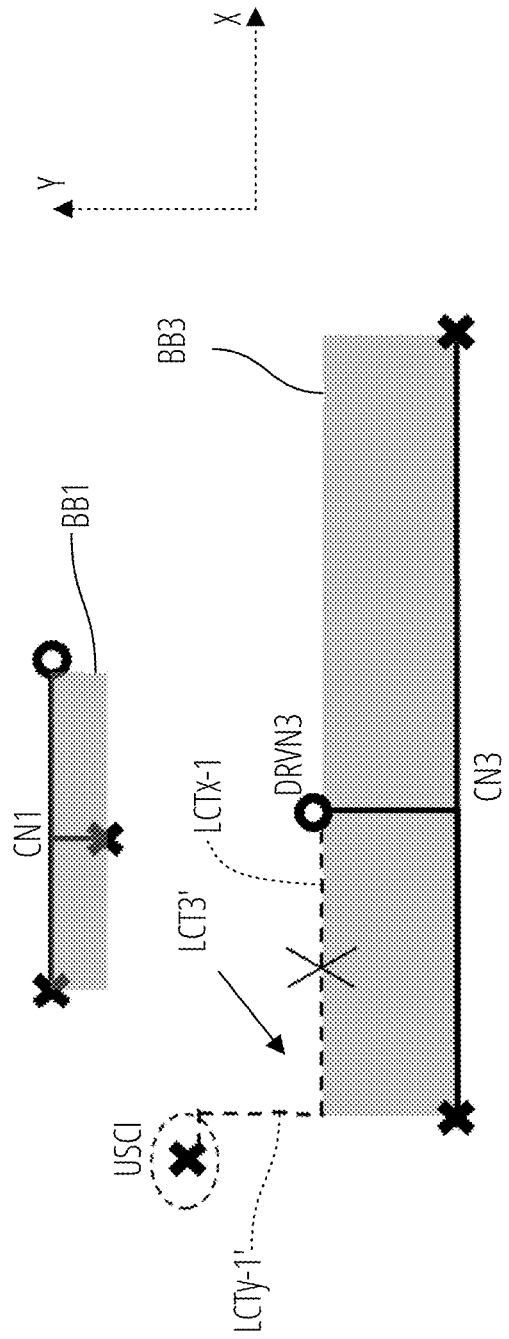
FIG. 16 illustrates an example of a routing blockage present for the lower clock net in the example of FIG. 15 and which results in the estimated conductive trace length for the lower clock net being longer than for the upper clock net.

FIG. 15 illustrates both the conductive trace lengths LCT1, LCT3 of FIGS. 14A and 14B for comparison to show that the trace length LCT1 to the upper clock net CN1 is shorter than the trace length LCT3 to the lower clock net CN3. In addition, FIG. 15 also illustrates the rationale for determining the source-to-sink length between a candidate clock net CN and the user-specified clock instance USCI based on an actual routing of traces that may be made using the Steiner routing or other suitable approach as discussed above in relation to FIGS. 14A, 14B. For the clock net CN3 in FIG. 15, a shorter routing of conductive traces seem to be possible by routing a conductive trace parallel to the X-axis along the upper edge of the bounding box BB3. This potential routing is illustrated in FIG. 16. The routing pattern illustrated in FIG. 16 is a shorter routing pattern for the clock net CN3 to interconnect the user-specified clock instance USCI and the clock net. This routing would have a length LCT3'=(LCTy-1'+LCTx-1) that is shorter than the length LCT3 for the clock net CN3 shown in FIG. 15. The length LCT3' is also shorter than the length LCT1 for the clock net CN1 shown in FIG. 15. The reason the routing pattern of FIG. 16 may not be utilized is that the routing of the conductive trace of length LCT3' along the upper edge of the bounding box BB3 is not possible due to a blockage present in the post-CTS clock tree including these clock nets CN1, CN3. This blockage is represented as an "X" through the conductive trace of length LCT3' in FIG. 16. There may be a variety of causes of the blockage preventing routing of the trace of length LCT3', as will be appreciated by those skilled in the art. Utilization of Steiner routing or other suitable approach to determine an actual routing of conductive traces between the user-specified clock instance USCI and each of the candidate clock nets CN enables such blockages to be taken into account to prevent erroneously selecting a candidate clock net based on a potential routing of conductive traces that is not physically possible in the post-CTS clock tree.

Figure 17:
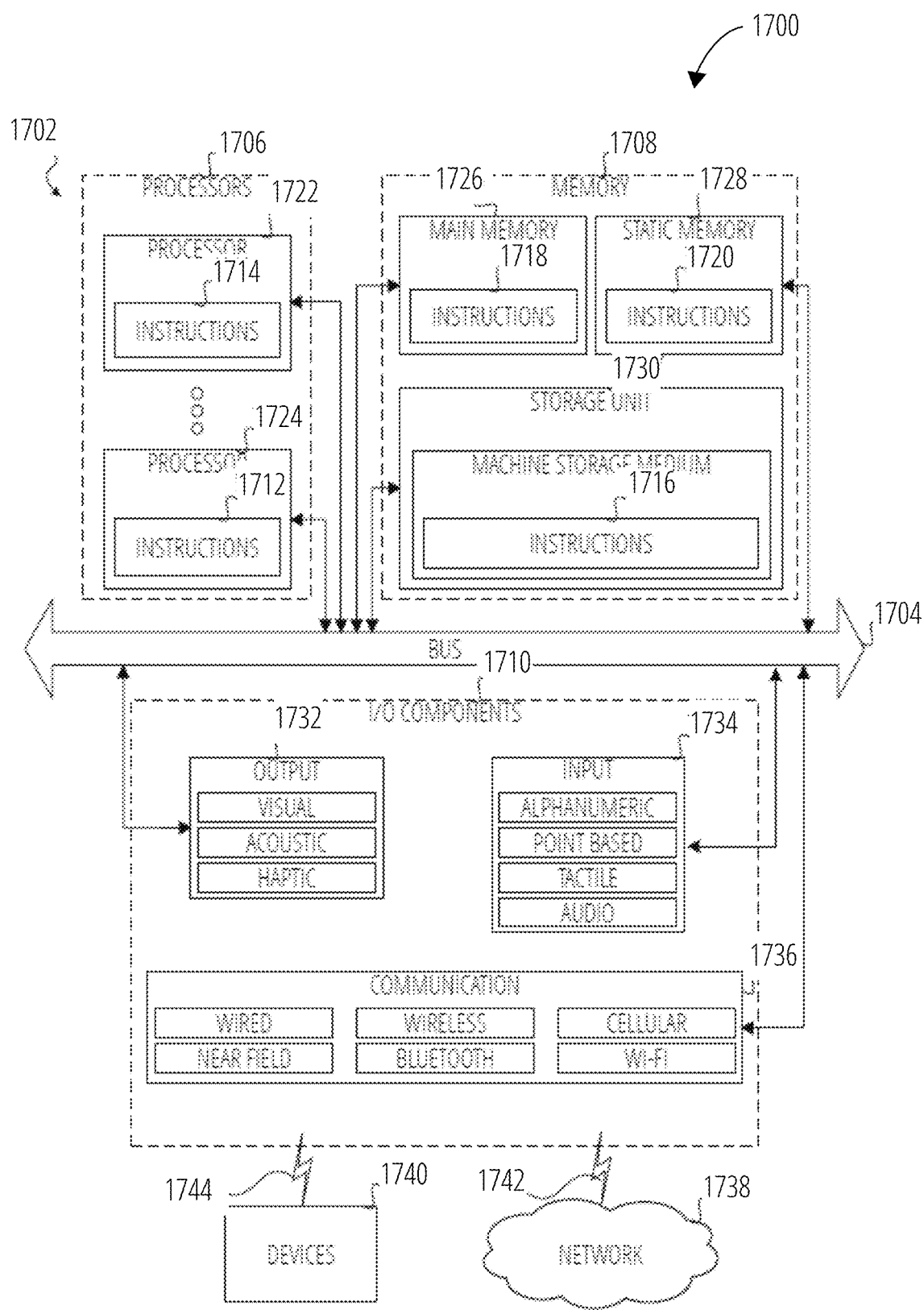
FIG. 17 is a functional block diagram of a computing system for carrying out methods and operations described herein in accordance with some embodiments.

FIG. 17 is a functional block diagram of a computing system 1700 for executing processes 500, 800 and other processes described above, along with other embodiments of the present disclosure. The computing system 1700 may execute on an EDA software system and for performing the processes 500, 800 and other processes described above, in accordance with some embodiments of the present disclosure. A machine 1702 is shown in the form of a computer system within which a set of instructions may be executed for causing the machine to perform any one or more of the processes 500, 800 and other methodologies discussed herein, according to some embodiments of the present disclosure. Specifically, FIG. 17 shows a diagrammatic representation of the machine 1702 in the example form of a computer system. The machine 1702 may include a bus 1704, processors 1706, memory 1708, and I/O components 1710, which may be configured to communicate with each other such as via the bus. The machine 1702 may include instructions 1712-1720 (e.g., software, a program, an application, an applet, an app, or other executable code) for causing the machine 1702 to perform any one or more of the methodologies discussed herein may be executed. For example, the instructions 1712-1720 may cause the machine 1702 to execute an EDA software system that executes the processes of FIGS. 5 and 8, and other processes described in the above description. The instructions 1712-1720 transform the general, non-programmed machine 1702 into a particular machine 1702 programmed to carry out the described and illustrated functions in the manner described here. In alternative embodiments, the machine 1702 operates as a standalone device or may be coupled (e.g., networked) to other machines. In a networked deployment, the machine 1702 may operate in the capacity of a server machine or a client machine in a server-client network environment, or as a peer machine in a peer-to-peer (or distributed) network environment. The machine 1702 may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 1712-1720, sequentially or otherwise, that specify actions to be taken by the machine 1702. Further, while only a single machine 1702 is illustrated, the term "machine" shall also be taken to include a collection of machines 1702 that individually or jointly execute the instructions 1712-1720 to perform any one or more of the methodologies discussed herein.

In an example embodiment, the processors 1706 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1722 and a processor 1724 that may execute the instructions 1714, 1712. The term "processor" is intended to include multi-core processors 1706 that may comprise two or more independent processors (sometimes referred to as "cores") that may execute instructions contemporaneously. Although FIG. 17 shows multiple processors 1706, the machine 1702 may include a single processor with a single core, a single processor with multiple cores (e.g., a multi-core processor), multiple processors with a single core, multiple processors with multiple cores, or any combination thereof.

The memory 1708 may include a main memory 1726, a static memory 1728, and a storage unit 1730, both accessible to the processors 1706 such as via the bus 1704. The main memory 1726, the static memory 1728, and the storage unit 1730 store the instructions 1716-1720 embodying any one or more of the processes, methodologies or functions described herein. The instructions 1712-1720 may also reside, completely or partially, within the main memory 1726, within the static memory 1728, within the storage unit 1720, within at least one of the processors 1706 (e.g., within the processor's cache memory), or any suitable combination thereof, during execution thereof by the machine 1702.

The I/O components 1710 may include a wide variety of components to receive input, provide output, produce output, transmit information, exchange information, capture measurements, and so on. The specific I/O components 1710 that are included in a particular machine will depend on the type of machine. For example, portable machines such as mobile phones will likely include a touch input device or other such input mechanisms, while a headless server machine will likely not include such a touch input device. It will be appreciated that the I/O components 1710 may include many other components that are not shown in FIG. 17. The I/O components 1710 are grouped according to functionality merely for simplifying the following discussion and the grouping is in no way limiting. In various example embodiments, the I/O components 1710 may include output components 1732 and input components 1734. The output components 1732 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1734 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1710 may include communication components 1736 operable to couple the machine 1702 to a network 1738 or devices 1740 via a coupling 1742 and a coupling 1744, respectively. For example, the communication components 1736 may include a network interface component or another suitable device to interface with the network 1738. In further examples, the communication components 1736 may include wired communication components, wireless communication components, cellular communication components, and other communication components to provide communication via other modalities. The devices 1740 may be another machine or any of a wide variety of peripheral devices (e.g., a peripheral device coupled via a universal serial bus (USB)).

Executable Instructions and Machine Storage Medium

The various memories (e.g., 1716, 1718, 1720, and/or memory of the processor(s) 1706) and/or the storage unit 1720 may store one or more sets of instructions and data structures (e.g., software) embodying or utilized by any one or more of the methodologies or functions described herein. These instructions, when executed by the processor(s) 1706, cause various operations to implement the disclosed embodiments.

As used herein, the terms "machine-storage medium," "device-storage medium," and "non-transitory computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media, "computer-storage media," and "device-storage media" specifically exclude carrier waves, modulated data signals, and other such media, at least some of which are covered under the term "signal medium" discussed below.

Transmission Medium

In various example embodiments, one or more portions of the network 1738 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1738 or a portion of the network 1738 may include a wireless or cellular network, and the coupling 1742 may be a Code Division Multiple Access (CDMA) connection, a Global System for Mobile communications (GSM) connection, or another type of cellular or wireless coupling. In this example, the coupling 1742 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1712 may be transmitted or received over the network 1738 using a transmission medium via a network interface device (e.g., a network interface component included in the communication components 1736) and utilizing any one of a number of well-known transfer protocols (e.g., hypertext transfer protocol (HTTP)). Similarly, the instructions 1712 may be transmitted or received using a transmission medium via the coupling 1744 (e.g., a peer-to-peer coupling) to the devices 1740. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1712 for execution by the machine 1702, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method, comprising:
   accessing an integrated circuit design stored in memory, the integrated circuit design including a post-CTS (clock tree synthesis) clock tree that includes a plurality of clock nets;
   receiving a request to add a user-specified clock instance to the post-CTS clock tree;
   detecting logically equivalent clock nets contained in the post-CTS clock tree from among the plurality of clock nets to generate a set of candidate clock nets;
   generating a reduced set of candidate clock nets from the set of candidate clock nets based on, for each candidate clock net in the set of candidate clock nets, a distance between the candidate clock net and the user-specified clock instance;
   selecting one of the candidate clock nets in the reduced set of candidate clock nets based on, for each of the candidate clock nets in the reduced set of candidate clock nets, a length of conductive traces required to interconnect the corresponding candidate clock net and the clock instance; and
   modifying the post-CTS clock tree to connect the clock instance to the selected one of the candidate clock nets.

2. The method of claim 1, wherein receiving the request to add the user-specified clock instance to the post-CTS clock tree includes at least one of receiving a request to add a new clock instance to the post-CTS clock tree or receiving a request to relocate an existing clock instance in the post-CTS clock tree.

3. The method of claim 2, wherein the clock instance comprises at least one of a clock gate, a clock sink, or a clock node.

4. The method of claim 3, wherein the length of conductive traces is a length of one or more conductive traces between a source node of selected candidate clock net and a clock node of the user-specified clock instance.

5. The method of claim 1, wherein detecting all logically equivalent clock nets contained in the post-CTS clock tree comprises:
   defining clock polarity, clock gating, power domain, module, and preservation of ports parameters in relation to the user-specified clock instance being added to the post-CTS clock tree; and
   detecting all logically equivalent clock nets based on the defined clock polarity, clock gating, power domain, module, and preservation of ports parameters.

6. The method of claim 5, wherein detecting all logically equivalent clock nets contained in the post-CTS clock tree includes eliminating clock nets in the post-CTS clock tree having a clock polarity parameter indicating an opposite clock polarity or having a clock-gating parameter indicating a crossing of a clock-gating boundary.

7. The method of claim 5, wherein generating a reduced set of candidate clock nets from the set of candidate clock nets comprises:
   defining a bounding box for each of the candidate clock nets in the set of candidate clock nets, each candidate clock net including a driving node and one or more driven nodes and the bounding box for the candidate clock net defining an area occupied by the candidate clock net that includes the driving node and the one or more driven nodes;
determining, for each of the candidate clock nets in the set of candidate clock nets, a distance between the bounding box of the clock net and the clock instance; and
selecting candidate clock nets in the set of candidate clock nets based on the determined distances for the candidate clock nets.

8. The method of claim 7, wherein determining the distance comprises, for each of the candidate clock nets in the set of candidate clock nets, determining a rectilinear distance between the bounding box of corresponding candidate clock net and the clock instance.

9. The method of claim 1, wherein selecting one of the candidate clock nets in the reduced set of candidate clock nets comprises:
calculating, for each of the candidate clock nets in the reduced set of candidate clock nets, the length of conductive traces required to interconnect the clock instance to a conductive trace in the corresponding candidate clock net; and
selecting the candidate clock net in the reduced set of candidate clock nets having a shortest length for the conductive traces.

10. The method of claim 1, wherein calculating the length of the conductive trace required to interconnect the user-specified clock instance to the conductive trace in the corresponding candidate clock net comprises calculating a length of a conductive trace between a driving node in the corresponding candidate clock net and a driven clock node in the user-specified clock instance.

11. A system comprising:
at least one processor; and
at least one memory storing instructions that, when executed by the processor, configure the system to perform operations comprising:
accessing an integrated circuit design stored in memory, the integrated circuit design including a post-CTS (clock tree synthesis) clock tree that includes a plurality of clock nets, each of the plurality of clock nets including conductive routes that interconnect a driving node that supplies a clock signal to one or more driven nodes that receive the clock signal;
receiving a request to add a user-specified clock instance to the post-CTS clock tree;
detecting all logically equivalent clock nets contained in the post-CTS clock tree from among the plurality of clock nets to generate a set of candidate clock nets;
generating a reduced set of candidate clock nets from the set of candidate clock nets based on, for each of the candidate clock nets in the set of candidate clock nets, a distance between a bounding box associated with a corresponding candidate clock net and the clock instance;
selecting one of the candidate clock nets in the reduced set of candidate clock nets based on, for each of the candidate clock nets in the reduced set of candidate clock nets, a length of a conductive trace required to interconnect the driving node of the corresponding candidate clock net and the clock instance; and
modifying the post-CTS clock tree to connect the clock instance to the selected one of the candidate clock nets.

12. The system of claim 11, wherein the request to add the clock instance to the post-CTS clock tree includes at least one of a request to add a new clock instance to the post-CTS clock tree or a request to relocate an existing clock instance in the post-CTS clock tree.

13. The system of claim 11, wherein the clock instance comprises at least one of a clock gate, a clock sink, or a clock node.

14. The system of claim 11, wherein detecting all logically equivalent clock nets contained in the post-CTS clock tree further comprises:
defining clock polarity, clock gating, power domain, module, and preservation of ports parameters in relation to the clock instance being added to the post-CTS clock tree; and
detecting all logically equivalent clock nets based on the defined clock polarity, clock gating, power domain, module, and preservation of ports parameters.

15. The system of claim 14, wherein generating a reduced set of candidate clock nets from the set of candidate clock nets comprises:
defining a bounding box for each of the candidate clock nets in the set of candidate clock nets, each candidate clock net including a driving node and one or more driven nodes and the bounding box for the candidate clock net defining an area occupied by the candidate clock net that includes the driving node and the one or more driven nodes;
determining a distance between the bounding box and the clock instance for each of the defined bounding boxes; and
selecting candidate clock nets in the set of candidate clock nets based on the determined distances for the defined bounding boxes.

16. A non-transitory computer-readable storage medium, the computer-readable storage medium including instructions that when executed by a computer, cause the computer to perform operations comprising:
accessing an integrated circuit design stored in memory, the integrated circuit design including a post-CTS (clock tree synthesis) clock tree that includes a plurality of clock nets;
receiving a request to add a user-specified clock instance to the post-CTS clock tree;
detecting logically equivalent clock nets contained in the post-CTS clock tree from among the plurality of clock nets to generate a set of candidate clock nets, the logically equivalent clock nets being detected based on one or more parameters defined for each clock net in relation to the user-specified clock instance;
generating a reduced set of candidate clock nets from the set of candidate clock nets based on, for each of the candidate clock nets in the set of candidate clock nets, a distance between the corresponding candidate clock net and the clock instance;
selecting one of the candidate clock nets in the reduced set of candidate clock nets based on, for each of the candidate clock nets in the reduced set of candidate clock nets, a length of a conductive trace required to interconnect the corresponding candidate clock net and the clock instance; and
restructuring the post-CTS clock tree to connect the clock instance to the selected one of the candidate clock nets.

17. The computer-readable storage medium of claim 16, wherein detecting logically equivalent clock nets contained in the post-CTS clock tree comprises:
defining, as the one or more parameters, clock polarity, clock gating, power domain, module, and preservation of ports parameters in relation to the clock instance being added to the post-CTS clock tree; and detecting all logically equivalent clock nets based on the defined clock polarity, clock gating, power domain, module, and preservation of ports parameters.

18. The computer-readable storage medium of claim 17, wherein detecting all logically equivalent clock nets contained in the post-CTS clock tree includes eliminating clock nets in the post-CTS clock tree having a clock polarity parameter indicating an opposite clock polarity or having a clock-gating parameter indicating a crossing of a clock-gating boundary.

19. The computer-readable storage medium of claim 16, wherein generating the reduced set of candidate clock nets from the set of candidate clock nets comprises:

defining a bounding box for each of the candidate clock nets in the set of candidate clock nets, each candidate clock net including a driving node and one or more driven nodes and the bounding box for the candidate clock net defining an area occupied by the candidate clock net that includes the driving node and the one or more driven nodes;

determining a distance between the bounding box and the clock instance; and selecting candidate clock nets in the set of candidate clock nets based on the determined distance for the bounding boxes.

20. The computer-readable storage medium of claim 19, wherein the distance is a rectilinear distance between the bounding box of the corresponding candidate clock net and the clock instance.

\* \* \* \* \*